(12) United States Patent
Beattie et al.

(10) Patent No.: US 6,820,245 B2
(45) Date of Patent: Nov. 16, 2004

(54) METHODS, SYSTEMS, AND COMPUTER PROGRAM PRODUCTS FOR MODELING INDUCTIVE EFFECTS IN A CIRCUIT BY COMBINING A PLURALITY OF LOCALIZED MODELS

(75) Inventors: Michael W. Beattie, Pittsburgh, PA (US); Lawrence T. Pileggi, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 127 days.

(21) Appl. No.: 10/096,446

(22) Filed: Mar. 12, 2002

(65) Prior Publication Data

US 2003/0177458 A1 Sep. 18, 2003

(51) Int. Cl.[7] .............................................. G06F 17/50
(52) U.S. Cl. ...................... 716/4; 716/1; 716/5; 716/7; 703/2; 703/14
(58) Field of Search ........................... 716/1–21; 703/2, 703/14

(56) References Cited

U.S. PATENT DOCUMENTS

| 5,861,644 | A | * | 1/1999 | Schary ........................ 257/275 |
| 6,088,523 | A | * | 7/2000 | Nabors et al. .......... 395/500.35 |
| 6,226,330 | B1 | * | 5/2001 | Mansur ...................... 375/257 |
| 6,342,823 | B1 | * | 1/2002 | Dansky et al. ................. 333/1 |
| 6,397,171 | B1 | * | 5/2002 | Belk ............................ 703/14 |
| 6,538,436 | B1 | * | 3/2003 | Simola et al. .............. 324/248 |
| 2003/0088393 | A1 | * | 5/2003 | Leonhardt .................... 703/14 |
| 2003/0115557 | A1 | * | 6/2003 | Elzinga ......................... 716/4 |

OTHER PUBLICATIONS

"Symmetric matrix", from Wikipedia, the free ancyclopedia, one page.*
"Symmetrix Matrix", mathworld.wolfram.com, one page.*
Ji et al., "KSim: A Stable and Efficient RKC Simulator for Capturing On–Chip Inductance Effect," IEEE, Jan. 30–Feb. 2, 2001, pp. 379–384.*
Zheng et al., "Window–Based Susceptance Models for Large–Scale RLC Circuit Analyses," IEEE, Mar. 4–8, 2002, pp. 1–6.*
Beattie et al., "Modeling Magnetic Coupling for On–Chip Interconnect," IEEE, Jun. 18–22, 2001, pp. 335–340.*
Dammers et al., "Virtual Screening: A Step Towards A Sparse Partial Inductance Matri," IEEE, Nov. 7–11, 1999, pp. 445–452.*

(List continued on next page.)

*Primary Examiner*—Vuthe Siek
(74) *Attorney, Agent, or Firm*—Myers Bigel Sibley & Sajovec

(57) ABSTRACT

Inductive effects in an integrated circuit device and/or system are modeled by partitioning the integrated circuit device and/or system into multiple windows or portions and determining a first localized inductance matrix for a first portion of the circuit and/or system and a second localized inductance matrix for a second portion of the circuit and/or system. The first and second localized inductance matrices are solved to obtain first and second localized susceptance vectors. The first and second localized susceptance vectors may be combined to form a susceptance matrix, which may be used directly in a susceptance-based simulator, or inverted to obtain a sparser inductance matrix that is representative of the inductive couplings in the entire integrated circuit device and/or system.

47 Claims, 18 Drawing Sheets

OTHER PUBLICATIONS

Chilo et al., "Magnetic Feld and Current Distributions in a System of Superconductor Microsrip Lines," IEEE, May 1983, pp. 1193–1195.*

Mautz et al., "The Inductance Matrix of a Multiconductor Transmission Line in Multiple Magnetic Media," IEEE, Aug. 1988, pp. 1293–1295.*

Beattie et al., "Equipotential Shells for Efficient Inductance Extraction," IEEE, Jan. 2001, pp. 70–79.*

Beattie et al., "Equipotential Shells for Efficient Partial Inductance Extraction," IEEE, Dec. 6–9, 1998, pp. 11.61–11.6.4.*

Beattie et al. *Efficient Inductance Extraction via Windowing.* 2001 Design Automation and Test in Europe, Munich, Germany, Mar. 13–16, 2001.

Beattie et al. "Electromagnetic Parasitic Extraction via a Multipole Method with Hierarchical Refinement," *Proc. ICCAD 1999*, Nov. 1999.

Beattie et al. "IC Analyses Including Extracted Inductance Models," *36th DAC*, Jun. 1999.

Devgan et al. "How to Effectively Capture On–Chip Inductance Effects: Introducing a New Circuit Element K," *ICCAD 2000*, Nov. 2000.

Nabors et al. "FastCap: A Multipole Accelerated 3–D Capacitance Extraction Program," *IEE Transactions on Computer–Aided Design.* vol. 10, No. 11, Nov. 1991, pp. 1447–1459.

Nagel et al. "Computer Analysis of Nonlinear Circuits, Excluding Radiation (CANCER)," *IEEE Journal of Solid–State Circuits,* vol. SC–6, No. 4, Aug. 1971, pp. 166–182.

Rosa, Edward B. "The Self and Mutual Inductances of Linear Conductors," *Bul. Nat. Bureau of Standards.* vol. 4, No. 2, 1908, pp. 300–343.

Ruehli, A.E. "Inductance Calculations in a Complex Integrated Circuit Environment," *IBM J. Res. Develop.* vol. 16, No. 5, Sep. 1972, pp. 470–480.

Jackson, J. *Classical Electrodynamics,* 2nd Ed., Sections 6.8–6.10, 1975, pp. 236–245.

Golub et al. *Matrix Computations,* 3rd Ed., Section 10.2, 1996, pp. 520–531.

Kamon et al. *FastHenry: A Mulitpole Accelerated 3–D Capacitance Extraction Program,* IEEE Trans. CAD, vol. 10, No. 11, Nov. 1991, pp. 1750–1758.

Press et al. *Numerical Recipes in C,* 2nd Ed., Chapters 2.7 and 2.10, 1992, pp. 71–102.

Ling et al. "Interconnection Modeling," *Circuit Analysis, Simulation and Design.* 1987, pp. 220–231.

* cited by examiner

○ - Full L and C matrices
● - Approximation: double-inverse inductance with 1% cutoff
◆ - Approximation: double-inverse inductance with 0.5% cutoff
■ - Approximation: simple truncation with 1% cutoff
▲ - Approximation: stabilized simple truncation with 1% cutoff ○ - Full L and C matrices
● - Approximation: double-inverse inductance with 1% cutoff
◆ - Approximation: double-inverse inductance with 0.5% cutoff
■ - Approximation: simple truncation with 1% cutoff
▲ - Approximation: stabilized simple truncation with 1% cutoff

METHODS, SYSTEMS, AND COMPUTER PROGRAM PRODUCTS FOR MODELING INDUCTIVE EFFECTS IN A CIRCUIT BY COMBINING A PLURALITY OF LOCALIZED MODELS

BACKGROUND OF THE INVENTION

The present invention relates generally to the field of electromagnetic modeling of integrated circuits and systems, and, more particularly, to methods, systems, and computer program products for modeling inductive effects in integrated circuits and systems.

In modern digital integrated circuits, logic path delays may be dominated by the influence of parasitic capacitive and inductive coupling among the metal interconnect wiring. As technologies may continue to demand increased performance from integrated circuit devices and systems, more detailed interconnect models may be needed to predict signal delay with greater accuracy. Due to the complexity of many integrated circuit devices and systems, such modeling may be computationally expensive. Increasing system size, however, may result in greater emphasis being placed on efficient analyses of parasitic effects and performance. Full three-dimensional interconnect models often have unmanageable sizes and/or densities associated therewith such that they may not be useful for analysis and simulation purposes without additional approximations and simplifications.

One class of electromagnetic properties that may be modeled is on-chip inductive effects and their interactions with on-chip capacitance. While operating frequencies may make on-chip inductive effects evident, localizing the magnetic couplings for efficient extraction and analysis may be difficult. Localized extraction techniques have been used for reducing the size of the interconnect models. It has been demonstrated, however, that simple truncation (i.e., discarding long range couplings) can reduce or destroy the stability of an electromagnetic model. Shell models have been applied for stable localized extraction, but finding the correct shell sizes for a particular target accuracy may not be straightforward. See, for example, Beattie el al., IC Analyses Including Extracted Inductance Models, 36$^{th}$ Design Automation Conference (DAC), June 1999, the disclosure of which is hereby incorporated herein by reference.

SUMMARY OF THE INVENTION

According to some embodiments of the present invention, inductive effects in an integrated circuit device and/or system are modeled by partitioning the integrated circuit device and/or system into multiple windows or portions and determining a first localized inductance matrix for a first portion of the circuit and/or system and a second localized inductance matrix for a second portion of the circuit and/or system. The first and second localized inductance matrices are solved to obtain first and second localized susceptance vectors. The first and second localized susceptance vectors may be combined to form a susceptance matrix, which may be used directly in a susceptance-based simulator, or inverted to obtain a sparser inductance matrix that is representative of the inductive couplings in the entire integrated circuit device and/or system. This inductance matrix may be sparsified by canceling one or more inductive coupling elements. Those inductive coupling elements that are canceled during sparsification may be added to the respective diagonal inductive coupling elements in the inductance matrix that correspond to the respective conductors for which the canceled inductive coupling elements were determined.

In other embodiments of the present invention, the window may be associated with an active conductor and the window size may be chosen by defining a susceptive coupling threshold and then increasing the size of the window until susceptive coupling elements for additional conductors to be contained in the window are less than the threshold. In particular embodiments, the susceptive coupling threshold may approximately 1% of the self-term susceptive coupling element magnitude.

In still other embodiments of the present invention, the localized inductance matrices may be solved to obtain localized susceptance vectors by determining, for the active conductor in each window or portion, the currents flowing through other conductors in the window such that the active conductor has a total magnetic flux of unity and the other conductors in the window have respective total magnetic fluxes of zero.

To allow the inductance matrix for the entire integrated circuit device and/or system to be positive definite, the susceptance matrix is made symmetrical. To allow symmetry of the susceptance matrix, in accordance with embodiments of the present invention, the susceptive coupling element determined for a pair of conductors with respect to a first window is compared with the susceptive coupling element determined for the pair of windows with respect to a second window. The element with the smaller absolute value of the two susceptive coupling elements is selected and the non-selected coupling element is replaced with the selected coupling element in the susceptance matrix. The foregoing operations are repeated for all active conductor pairs.

In still other embodiments of the present invention, the susceptance matrix may be sparsified by canceling one or more susceptive coupling elements. Those susceptive coupling elements that are canceled during sparsification may be added to the respective diagonal susceptive coupling elements in the susceptance matrix that correspond to the conductors between which the canceled susceptive coupling elements were determined.

Although the present invention has been described above primarily with respect to method aspects of the invention, it will be understood that the present invention may be embodied as methods, systems, and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
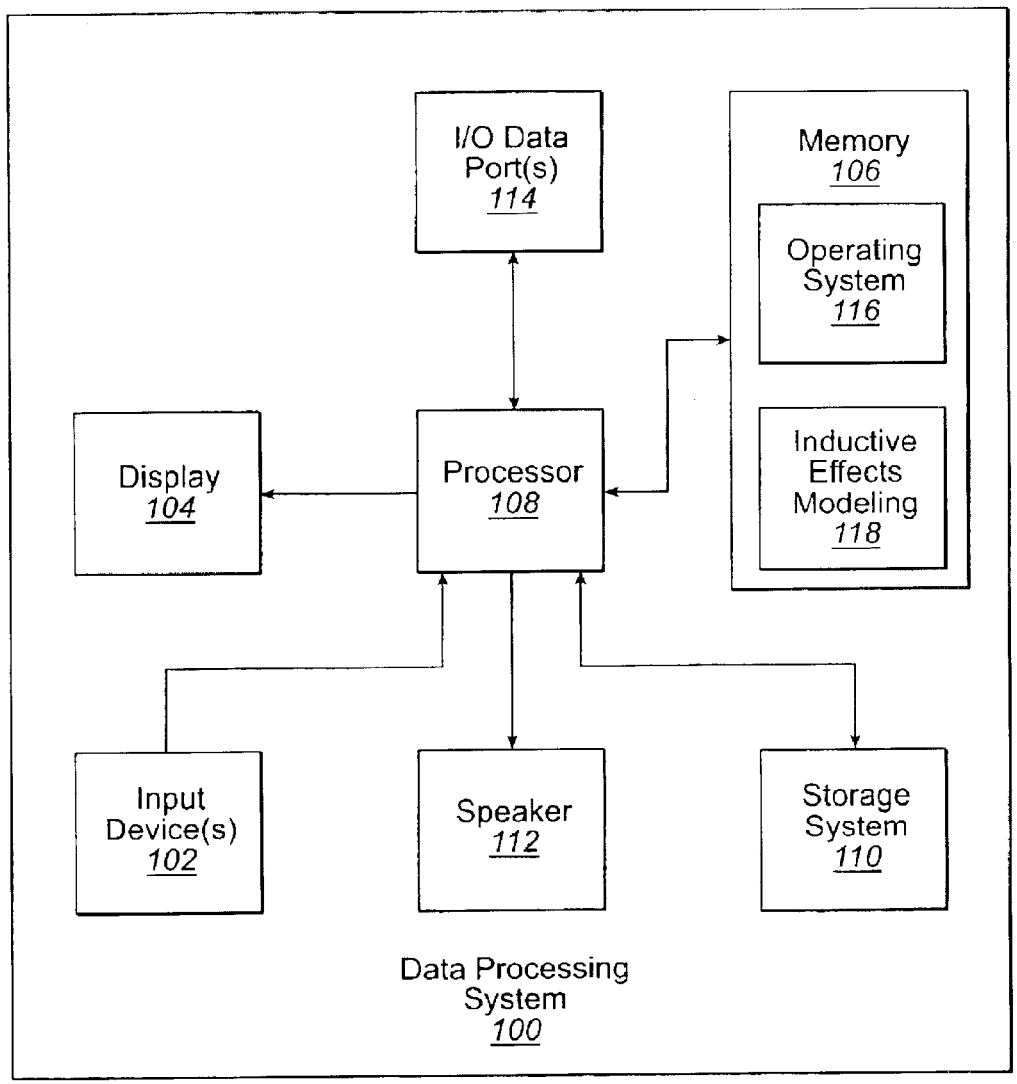
FIG. 1 is a block diagram that illustrates data processing systems that may model inductive effects in a circuit and/or system by combining multiple localized inductive effect models in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, data processing systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 1, an exemplary data processing system 100 that may be used to model inductive effects in a circuit, in accordance with embodiments of the present invention, comprises input device(s) 102, such as a keyboard or keypad, a display 104, and a memory 106 that communicate with a processor 108. The data processing system 100 may further include a storage system 110, a speaker 112, and an input/output (I/O) data port(s) 114 that also communicate with the processor 108. The storage system 110 may include removable and/or fixed media, such as floppy disks, ZIP drives, hard disks, or the like, as well as virtual storage, such as a RAMDISK. The I/O data port(s) 114 may be used to transfer information between the data processing system 100 and another computer system or a network (e.g., the Internet). These components may be conventional components such as those used in many conventional computing devices and/or systems, which may be configured to operate as described herein.

The processor 108 communicates with the memory 106 via an address/data bus. The processor 108 may be, for example, a commercially available or custom microprocessor. The memory 106 is representative of the overall hierarchy of memory devices containing the software and data used to model inductive effects in a circuit, in accordance with embodiments of the present invention. The memory 106 may include, but is not limited to, the following types of devices: cache, ROM, PROM, EPROM, EEPROM, flash, SRAM, and DRAM.

As shown in FIG. 1, the memory 106 may contain up to two or more major categories of software and/or data: the operating system 116 and the inductive effects modeling module 118. The operating system 116 controls the operation of the computer system. In particular, the operating system 116 may manage the computer system's resources and may coordinate execution of programs by the processor 108. The inductive effects modeling module 118 may be configured to model inductive effects in an integrated circuit device and/or system by combining localized inductive effect models associated with windows or portions of the integrated circuit device and/or system. In particular, the inductive effects modeling module 118 may be configured to process multiple matrices associated with the localized inductive effect models and to combine these matrices into a global matrix that is representative of the inductive couplings of the entire integrated circuit device and/or system.

Although FIG. 1 illustrates an exemplary software architecture that may be used for modeling inductive effects in an integrated circuit device and/or system by combining localized inductive effect models, in accordance with embodiments of the present invention, it will be understood that the present invention is not limited to such a configuration but is intended to encompass any configuration capable of carrying out the operations described herein. Moreover, as used herein, an integrated circuit may comprise one or more chips and a system may comprise a multi-chip module, which may include next-level packaging.

Computer program code for carrying out operations of the present invention may be written in an object-oriented programming language, such as Java, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage. It will be further appreciated that the functionality of any or all of the program modules may also be implemented using discrete hardware components, a single application specific integrated circuit (ASIC), or a programmed digital signal processor or microcontroller.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 2:
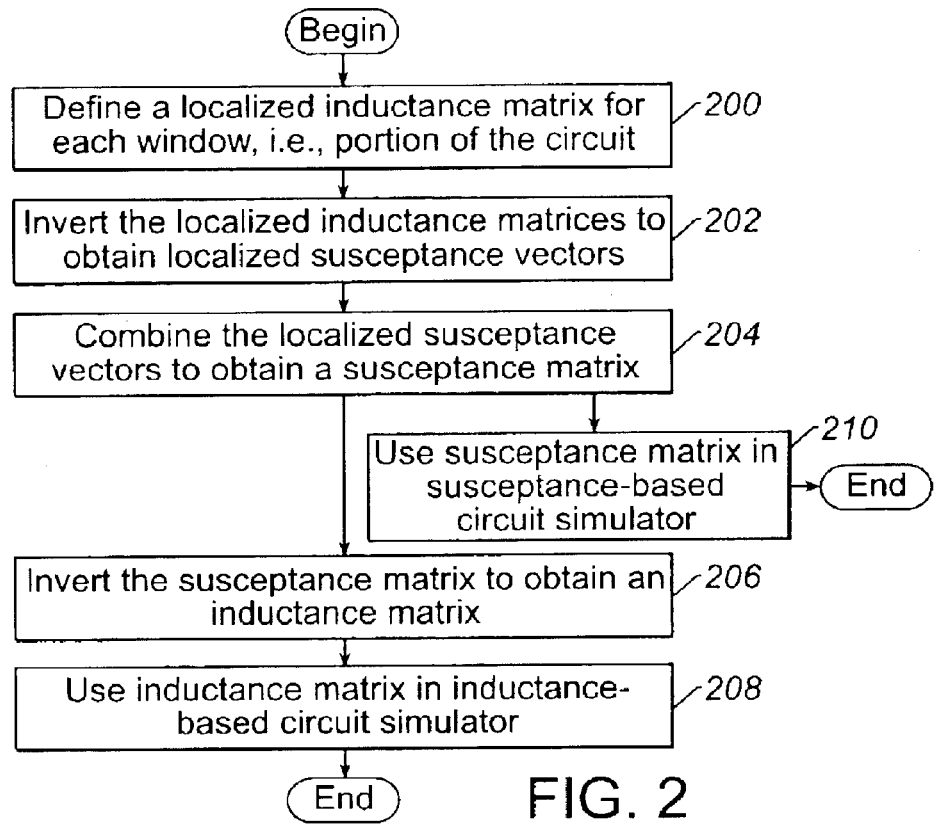
FIGS. 2–7 are flowcharts that illustrate operations of methods, systems, and computer program products for modeling inductive effects in a circuit and/or system by combining multiple localized inductive effect models in accordance with embodiments of the present invention.

With reference to the flowcharts of FIGS. 2–5, exemplary operations of methods, systems, and/or computer program products for modeling inductive effects in an integrated circuit device and/or system by combining localized inductive effect models, in accordance with embodiments of the present invention, will be described hereafter. Referring now to FIG. 2, operations begin at block 200 where an integrated circuit device and/or system is partitioned into a plurality of windows or portions in which each window is associated with an active conductor. A localized inductance matrix is determined for each window such that the elements of the localized inductance matrices represent the couplings between the respective active conductors and the other conductors in the respective windows or portions. At block 202, the localized inductance matrices are respectively solved to obtain localized susceptive coupling vectors from the respective active conductor to itself and all other conductors in the respective window or portion. Advantageously, the localized susceptive couplings may have properties similar to capacitive couplings, such as shielding, which may be exploited to combine the localized susceptive couplings into a sparse susceptance matrix at block 204. The susceptance matrix may then be inverted at block 206 to obtain an inductance matrix that is representative of the inductive couplings of the entire integrated circuit device and/or system. The inductance matrix obtained at block 206 may be further sparsified in an accurate and stable manner. Moreover, at block 208, this double-inverse inductance matrix may be used in an inductance-based circuit simulator, for example, for timing analysis and/or simulation without loss of generality. In other embodiments, the susceptance matrix obtained at block 204 may be used in a susceptance-based circuit simulator at block 210.

Figure 3:
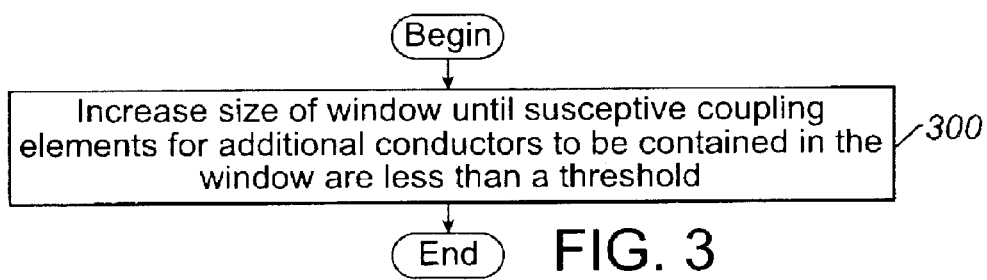

Referring now to FIG. 3, prior to defining a localized inductance matrix for each window as discussed above with respect to block 200 of FIG. 2, the window size may be chosen at block 300, in accordance with embodiments of the present invention, by defining a susceptive coupling threshold and then increasing the size of the window until susceptive coupling elements for additional conductors to be contained in the window are less than the threshold. In particular embodiments, the susceptive coupling threshold may be approximately 1% of the self-term susceptive coupling element magnitude of the active conductor associated with the window.

Figure 4:
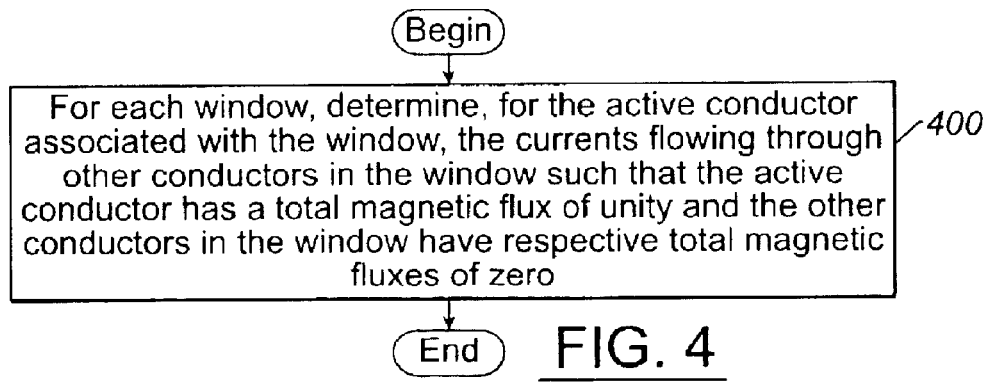

Referring now to FIG. 4, the solving of the localized inductance matrices discussed above with respect to block 202 of FIG. 2 may be performed, according to embodiments of the present invention, by determining at block 400, for the active conductor in each window or portion, the currents flowing through other conductors in the window such that the active conductor has a total magnetic flux of unity and the other conductors in the window have respective total magnetic fluxes of zero.

Figure 5:
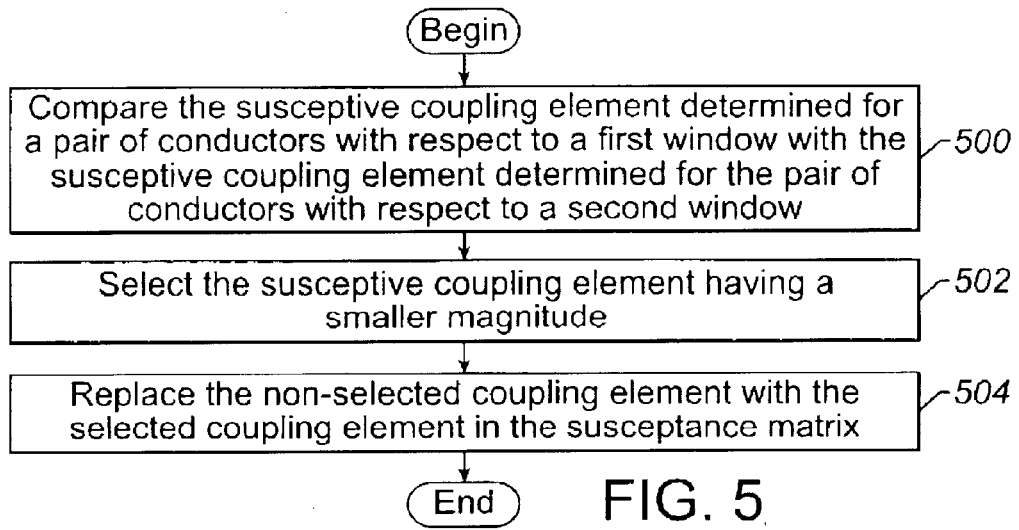

In some embodiments, to provide positive definiteness of the inductance matrix for the entire integrated circuit device and/or system, the susceptance matrix obtained at block 204 of FIG. 2 may be made symmetrical. Referring now to FIG. 5, operations to provide symmetry, in accordance with embodiments of the present invention, begin at block 500 where the susceptive coupling element determined for a pair of conductors with respect to a first window is compared with the susceptive coupling element determined for the pair of windows with respect to a second window. At block 502 the element of the two susceptive coupling elements that has the smaller absolute value or magnitude is selected and the non-selected coupling element is replaced with the selected coupling element in the susceptance matrix at block 504. The foregoing operations of FIG. 5 are repeated for all active conductor pairs. Because the susceptive coupling elements are non-positive, according to embodiments of the invention, selecting the greater of the two susceptive coupling elements at block 502 may comprise selecting the susceptive coupling element having the smallest magnitude. Advantageously, this may ensure diagonal dominance of the inductance matrix for the entire integrated circuit device and/or system while maintaining a relatively high degree of accuracy.

Figure 6:
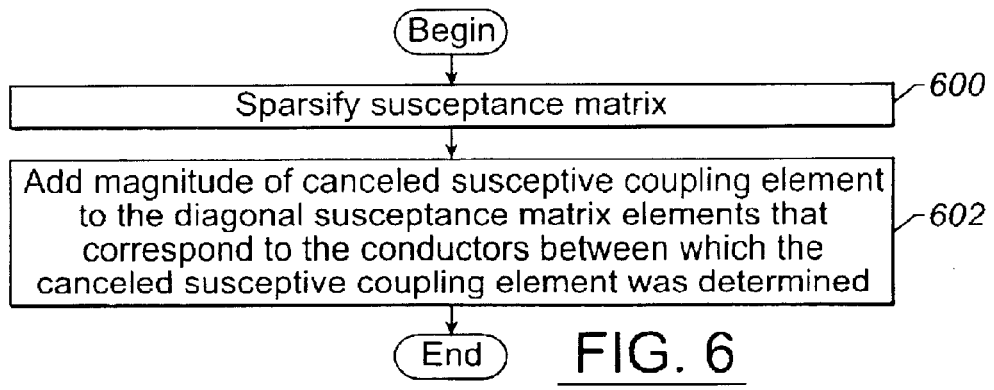

In accordance with some embodiments of the present invention, the susceptance matrix for the entire integrated circuit device and/or system is both positive definite and diagonal dominant. Based on principles of linear algebra, positive definiteness of the susceptance matrix is preserved when off-diagonal elements are set to zero. Thus, referring now to FIG. 6, the susceptance matrix obtained at block 204 of FIG. 2 may, according to embodiments of the present invention, be sparsified at block 600 by canceling one or more susceptive coupling elements while maintaining diagonal dominance and positive definiteness. For increased accuracy, those susceptive coupling elements that are canceled during sparsification may optionally be added to the respective diagonal susceptive coupling elements in the susceptance matrix that correspond to the conductors between which the canceled susceptive coupling elements were determined at block 602.

Figure 7:
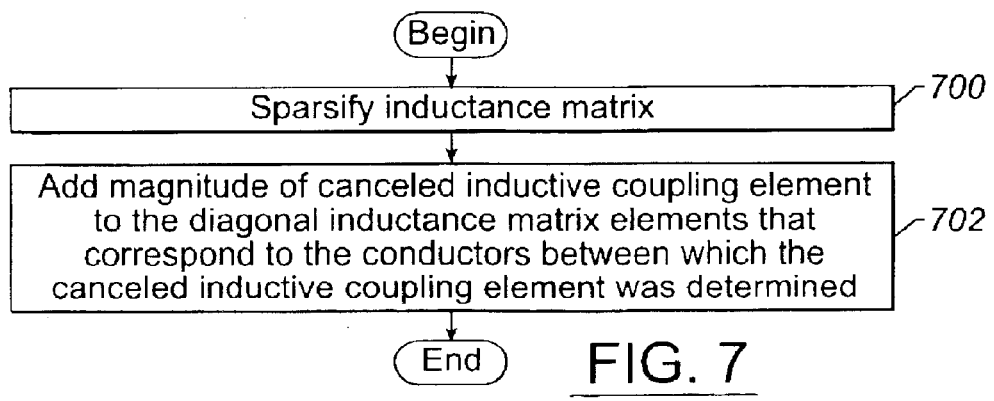

Referring now to FIG. 7, in other embodiments of the present invention, the inductance matrix obtained at block 206 of FIG. 2 may be sparsified at block 700 by canceling one or more inductive coupling elements. To maintain positive definiteness, those inductive coupling elements that are canceled during sparsification may optionally be added to the respective diagonal inductive coupling elements in the inductance matrix that correspond to the conductors between which the canceled inductive coupling elements were determined at block 702.

The flowcharts of FIGS. 2–7 illustrate the architecture, functionality, and operations of possible embodiments of the data processing system 100 of FIG. 1. In this regard, each block may represent a module, segment, or portion of code, which comprises one or more executable instructions for implementing the specified logical function(s). It should also be noted that in some alternative embodiments, the functions noted in the blocks may occur out of the order noted in FIGS. 2–7. For example, two blocks shown in succession may in fact be executed substantially concurrently or the blocks may sometimes be executed in the reverse order, depending on the functionality involved.

A detailed mathematical analysis of methods, systems, and/or computer program products for modeling inductive effects in an integrated circuit device and/or system by combining multiple localized inductive effect models, in accordance with embodiments of the present invention, will now be provided.

Some properties of capacitance and susceptance matrices, which facilitate modeling inductive effects, in accordance with embodiments of the present invention, will be described hereafter.

A boundary element approach is assumed where the source (charge/current) density is constant for each section (panel/filament).

$$\psi_i^a = (\phi_i; A_{i,x}; A_{i,y}; A_{i,z}) \quad (1)$$

is the vector of average potentials for section i. The field type $\alpha$ is 0 for the electrostatic and 1, 2, or 3 for the xyz magnetostatic cases. The discrete source vector is $$\gamma_i^\alpha = (q_j 1 \epsilon; \mu l_{j,x} 1_{j,x}; \mu l_{j,y} 1_{j,y}; \mu l_{j,y} 1_{j,y}) \quad (2)$$

where $q_j$ and $I_{j,(xyz)}$ are the charge and the three current components for this section. The $l_{j,(xyz)}$ are the dimensions of section j. The discretized electromagnetic interconnect interactions may be written as $$K_{ij}^\alpha \equiv \frac{1}{W_i^\alpha} \frac{1}{W_j^\alpha} \frac{1}{4\pi} \int_{W_i^\alpha} \int_{W_j^\alpha} \frac{1}{\|\bar{r}_i - \bar{r}_j\|} dW_i^\alpha dW_j^\alpha \quad (3)$$

by defining the matrices $K^\alpha$. $W_i^\alpha$ is the content (panel area or filament volume) of section i for field type $\alpha$. These in turn form the four diagonal blocks of the electromagnetic interaction matrix K in $$\psi \approx K\bar{\gamma} \quad (4)$$

where $\bar{\psi}$ and $\bar{\gamma}$ are formed by concatenating $\bar{\psi}^\alpha$ or $\bar{\gamma}^\alpha$.

The capacitance matrix, $C = S^0$, can be found by inverting the potential matrix $P = K^0$. The inverses of the partial inductance matrices $L_x = K^1$, $L_y = K^2$ and $L_z = K^3$ are the susceptance matrices $S^1$, $S^2$ and $S^3$ of the system. Together these four blocks form the inverse interaction matrix S.

Positive Definiteness of K: The term $K\bar{\gamma}$ represents (within the accuracy of the discretization) the electric scalar and magnetic vector potential. The combined energy stored in the electromagnetic field is $(\int [\rho(\bar{r})\phi(\bar{r}) + \bar{j}(\bar{r}) \cdot \bar{A}(\bar{r})])/2$, and is non-negative. J. Jackson, *Classical Electrodynamics*, $2^{nd}$ Ed., John Wiley & Sons, New York (1975). It follows that $$\bar{\gamma} K \bar{\gamma} \geq 0 \quad , (5)$$

which is zero if and only if no electric and magnetic sources are present. It follows that K, as well as S, must be positive definite. Diagonal Elements of S are positive: K is positive definite, so $$\forall \bar{\gamma} \neq 0 : \bar{\gamma}^T K \bar{\gamma} > 0 \quad (6)$$

If $\gamma$ is the solution of $K\bar{\gamma} = e_i$ (which has to exist and be unique), where $e_i$ is the unit vector with 1 as $i^{th}$ element, then $\bar{\gamma} = S e_i$ and with (6) find $$\forall e_i: e_i^T S^T K S e_i > 0 \quad (7)$$

With SK=I it follows that $$\forall e_i: e_i^T S^T e_i = S_{ii} > 0 \quad (8)$$

This equates to all diagonal elements of S being positive, because S is a square matrix. A current in segment i in positive x-direction creates vector potential in j in positive x-direction as well. Compensating current in j must flow in negative x-direction.

Off-Diagonals of S are negative or zero: Next it can be shown that all off-diagonal elements of S are either negative or zero. For the electric case (a=0) this is shown in D. Ling, A. Ruehli, *Interconnection Modeling, in Circuit Analysis, Simulation and Design*, Elsevier Science Publishers B. V., North-Holland, (1987). If conductor i is at unit potential and everywhere else is at zero potential, then according to Equation 8, conductor i will have a positive charge thereon. This positive charge will create a positive potential at the locations of other conductors and negative charge needs to be added to those grounded conductors to ensure zero potential. Thus, for $\alpha=0$ (electric fields), it follows that $\forall j \neq i : S_{ij}^0 < 0$.

Figure 8:
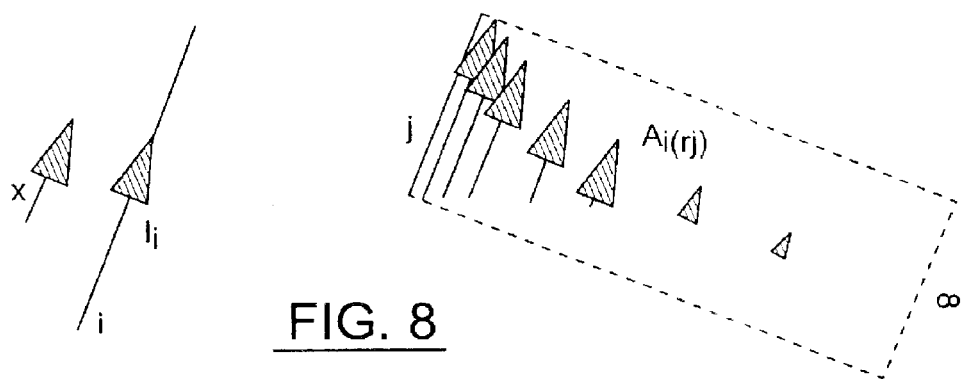
FIG. 8 is diagram that illustrates electromagnetic effects of current flow in proximal conductors.

For $\alpha=1, 2, 3$, the currents are defined to be directed in the positive xyz directions. Similar to the electric case above, if, for example, conductor i is at a unit vector potential in the x-direction, then there must be, because of Equation 8, a current flowing through conductor i in the positive x-direction as shown in FIG. 8. This creates magnetic vector potential within the loops of the other segments j. To get a zero vector potential for all other segmnents j, currents in the negative x-directions must flow through those segments. The same principles also apply to they and z-directions. So the off-diagonal elements of S must be negative here as well (for the given current direction convention). For the entire inverse interaction matrix, it follows that $$\forall j \neq i : S_{ij} < 0 \quad (9)$$

Diagonal Dominance of S: Because sources $\bar{I}$ are found on or within the conductors in the system, the electrostatic and magnetostatic potentials in the insulator satisfy Laplace's equation with the surfaces of the conductors and infinity being the boundaries of the domain:

$$\Delta^2 \bar{\psi} = 0 \quad (10)$$

If the (electro- or magnetostatic) potential $\bar{\psi}$ is unity for all conductors, then each element of $\bar{\psi}$ must be maximal on each conductor. This is a property of harmonic functions, see, e.g., I. Bronshtein, K. Semendyayev, *Handbook of Mathematics*, Third Edition, Van Nostrand Reinhold for solutions to Lapalace's equation. It follows that the gradient of each of the four elements of $\bar{\psi}$ on the surface of each conductor is pointing into the conductors. For the electric case, this means that surfaces are positively charged, because the electric field points into the dielectric material.

For the magnetic case, this means that the vector potential components, $A_x$, $A_y$ and $A_z$ are positive because solutions of Laplace's equation are maximal and minimal on the boundary of their definition domain. Here, the maximum (by construction unit) are the combined conductor surfaces, the minimum is infinity where the vector potential is zero by convention. Finally, because the vector potential components are positive, currents also flow in the positive fez directions in the conductors because if not, there would be locations with negative vector potential components, creating a contradiction.

Combining the electrostatic and magnetostatic case, it follows that $$\gamma = S\bar{\psi} = S \begin{bmatrix} i \\ \ldots \\ i \end{bmatrix} > \bar{0} \text{ so for each row: } \sum_j S_{ij} > 0 \quad (11)$$

The "greater as" in the first part of Equation 11 acts element for element. Based on Equations 8 and 9, which give the signs of the $S_{ij}$ (diagonals positive, off-diagonals negative), it follows that S is diagonal dominant:

$$|S_{ii}| > \sum_{j \neq i} |S_{ij}| \quad (12)$$

Positive Definiteness of Truncated S: S has been shown to be positive definite. Due to its diagonal dominance, the positive definiteness of S is preserved when off-diagonal elements are set to zero—a property not available for K. For this, the following theorem from linear algebra (R. Horn, C. Johnson, *Matrix Analysis*, Cambridge University Press, Cambridge (1985)) for a matrix A is used:

If all $A_{ii} > 0$ and A, $A^T$ diagonal dominant then A is positive definite (13)

Diagonal dominance and positivity of the diagonal elements of S have been shown previously. Based on Equation 13, the positive definiteness of the sparsified S follows.

Shielding Effect in S: To assist in understanding the physical interpretation of susceptance, the following question is asked: What is the significance of the $j^{th}$ column of S? The $j^{th}$ column of S is the amount of source (charge or current) on or flowing through the conductors to force conductor j to unit (electric or magnetic) potential and other conductors to zero potential. An individual term $S_{ij}$, when i and j are far removed, includes shielding effects for the electrostatic and the magnetostatic fields. The "source" in some conductor i to force it to zero potential already takes into account that some of the original field of the reference (unit potential) conductor j has been compensated for by charges/currents on zero potential conductors closer to j. This means that the magnitude of the elements in $S_{ij}$ drops off faster with distance between i and j. This may enhance sparsification, because elements that are "large enough" in S may be easier to distinguish from those that are "too small", thereby forming a smaller set than for the interaction matrix K.

Stability of S under Window Inversion: Because the shielding effect renders all but a few short-distance couplings negligible, this may be exploited to make the inversion from K to S more efficient by only including those few neighbors of the current unit potential conductor in the inversion. That is, the inversion may be restricted to extraction windows around each conductor, thereby replacing the inversion of a huge, dense N×N matrix—N being the total number of conductors in the system—by N times an inversion of smaller $n_j \times n_j$ matrices. This results in N, individual, small matrices S(j), where $n_j$ is the number of conductors to which segment j has significant couplings.

The S(j) are diagonally dominant, because the proof above applies to each of the small conductor subsets individually. For this approach, the coupling $S_{ij}(j)$ need not to be equal to $S_{ij}(i)$, because the set of significant neighbors' is usually different for different segments i and j. When the sparse S' matrix is assembled for the entire system from the individual S(j), the symmetry of S' may need to be preserved. To guarantee positive definiteness of S', choose $$S'_{ij} = S'_{ji} = \max\{S_{ij}(j), S_{ji}(i)\} \quad (14)$$

Because all off-diagonal elements of any inverse interaction matrix are non-positive, the element with the smallest magnitude is selected. This ensures the diagonal dominance of S' when assembling it from elements of the S(j), while preserving accuracy. Based on Equation 13, it follows that the sparse approximation S' is positive definite.

Two potential drawbacks to using partial inductance to model magnetic interactions for on-chip interconnect may be 1) the slow, logarithmic decay of the couplings with the distance between the filaments; and 2) the absence of any shielding effect. This may make localizing partial inductance difficult. It has been shown above, however, that using susceptance rather than inductance for modeling the magnetic field interactions may be beneficial.

It has also been shown above that it is possible to provide the stability of sparse susceptance matrices. A windowing approach is applied to solve many small local inductance systems rather than one large problem. When assembling partial results into a sparse global susceptance matrix, the stability of the symmetric result may be ensured by choosing the off-diagonal with the smaller magnitude.

The window size may be chosen to include only long-range susceptive couplings above a given magnitude threshold relative to the self terms. One percent cutoff means, for example, that the window size is chosen such that increasing the window adds new susceptive couplings less than 1% of the self term for a given active conductor. The window sizes may be smaller for susceptance than for the initial inductive model, due to the shielding effect for S.

The global, sparse susceptance matrix is positive definite, so inverting this sparse S matrix back into an inductance representation, using sparse matrix solving techniques (G. Golub, C. Van Loan, *Matrix Computations*, $3^{rd}$ Ed., Johns Hopkins University Press, Baltimore (1996)), yields again a positive definite matrix.

Figure 9:
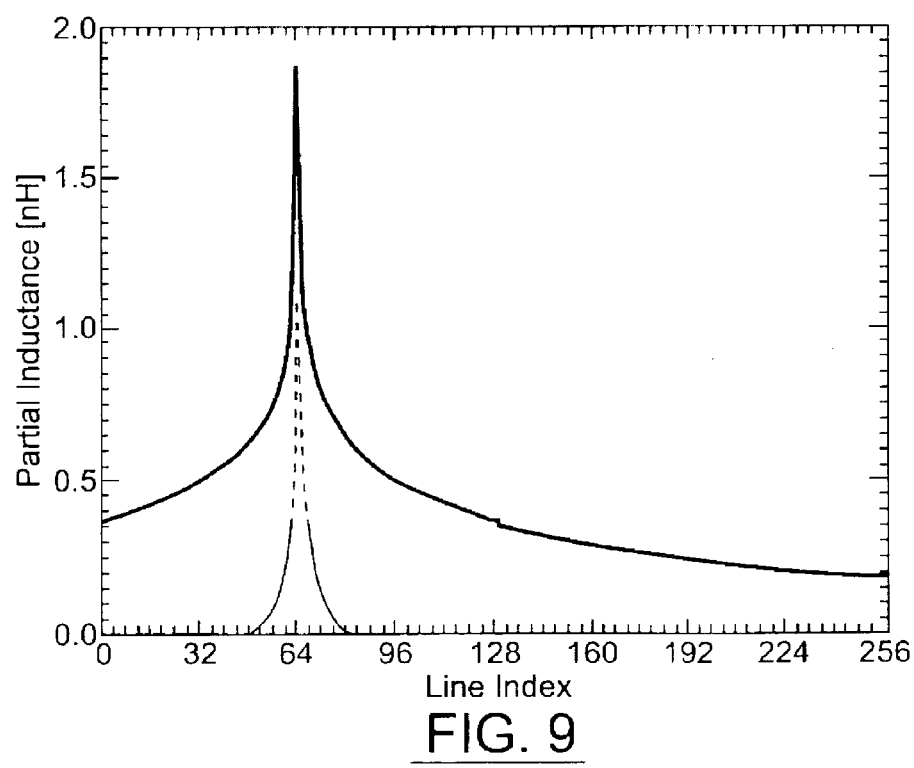
FIG. 9 is a graph that illustrates inductive couplings between conductors in the 128-bit bus of FIG. 10.
Figure 10:
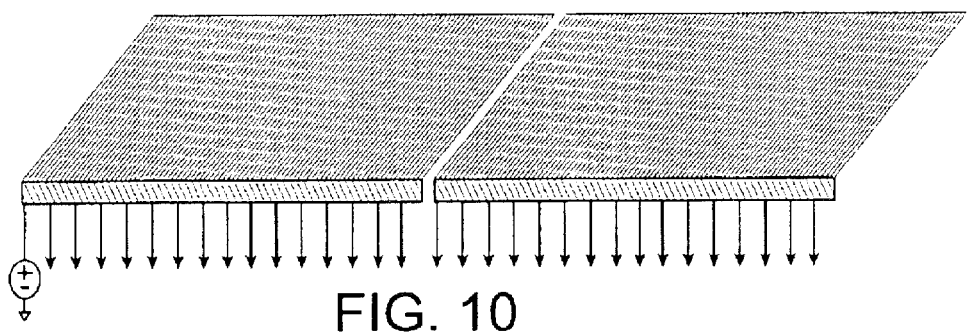
FIG. 10 is a diagram that illustrates an exemplary bus that comprises two blocks of 128 lines.
Figure 11A:
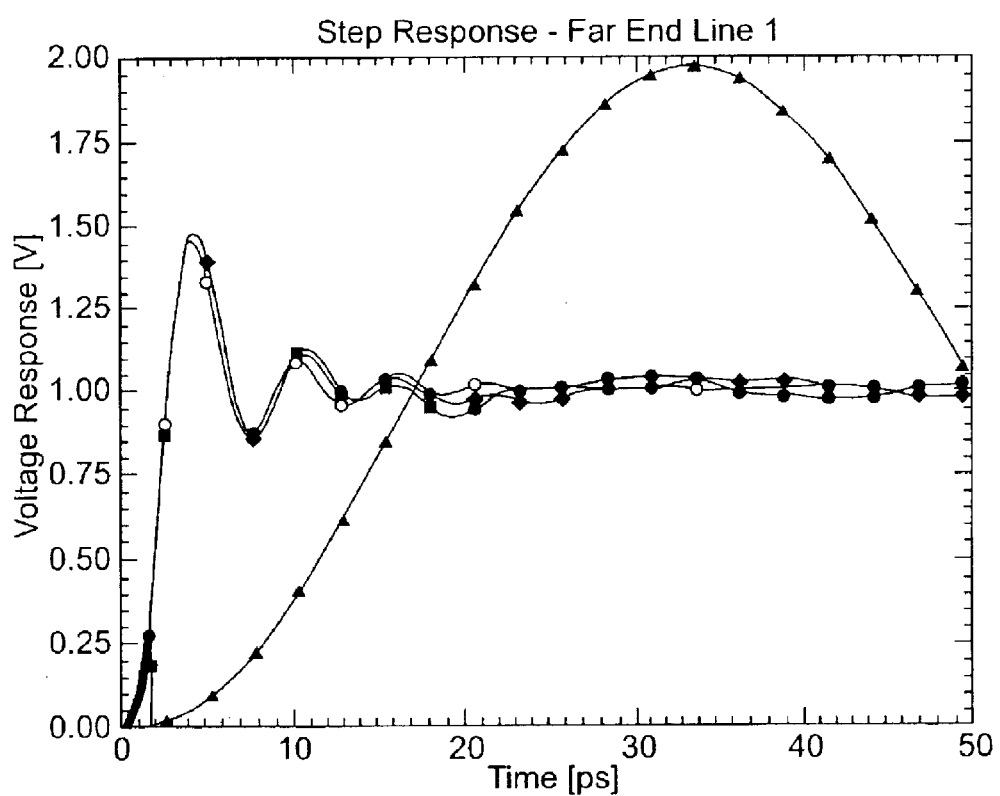
FIGS. 11A–11D are graphs that illustrate simulated voltage waveforms at lines one and four of the bus of FIG. 10 in response to a step input voltage and a ramp input voltage.
Figure 11B:
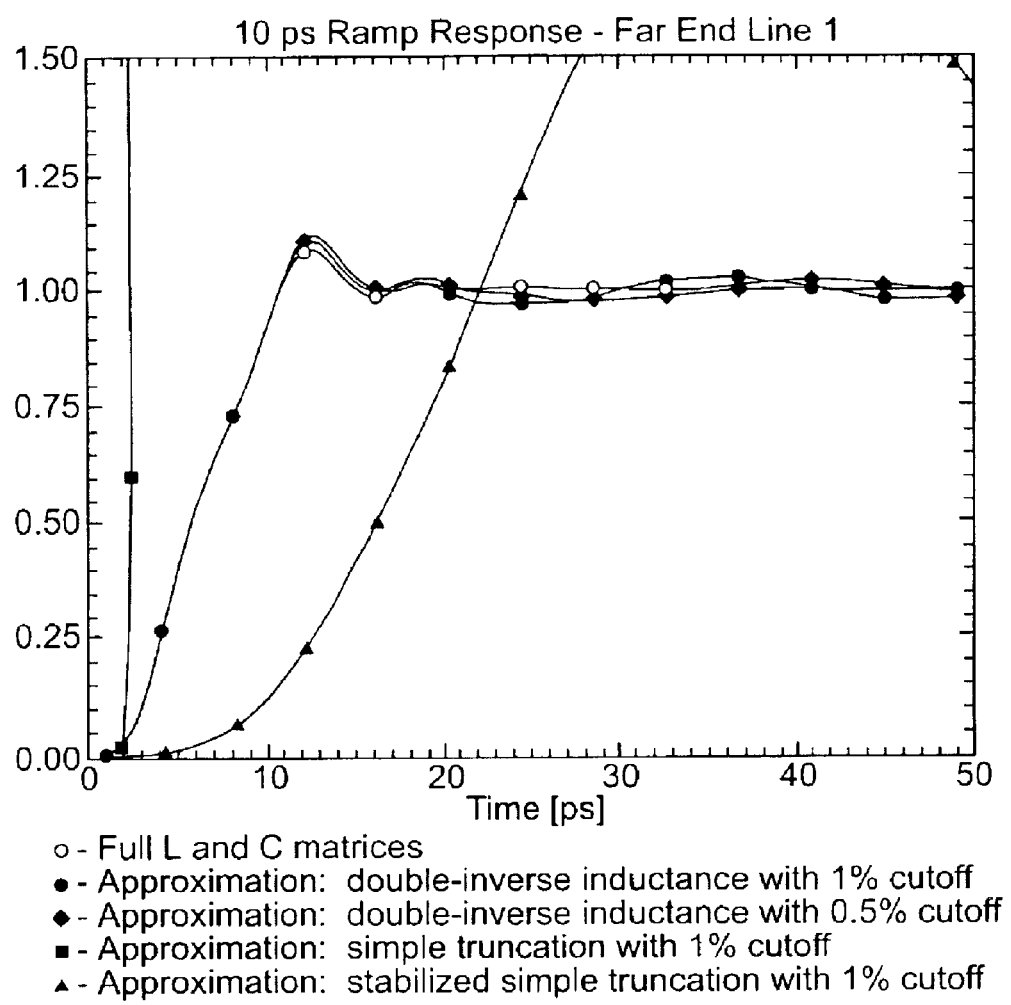
Figure 11C:
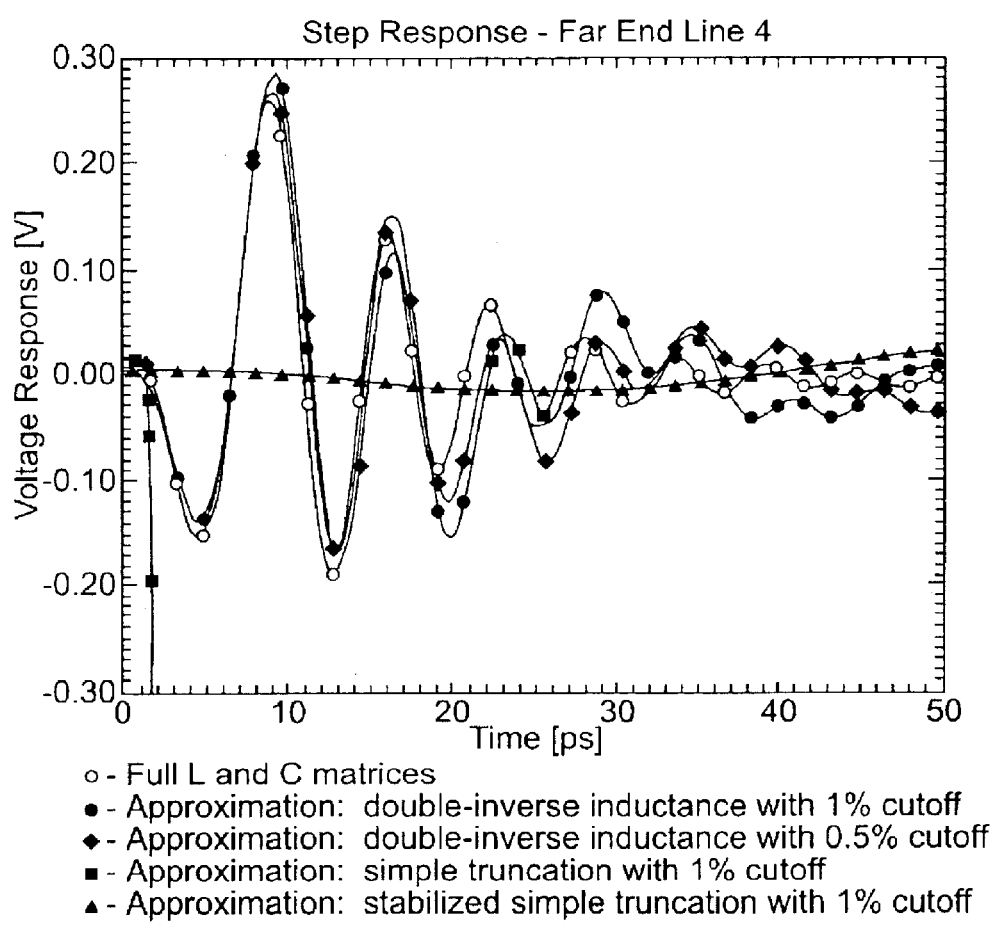
Figure 11D:
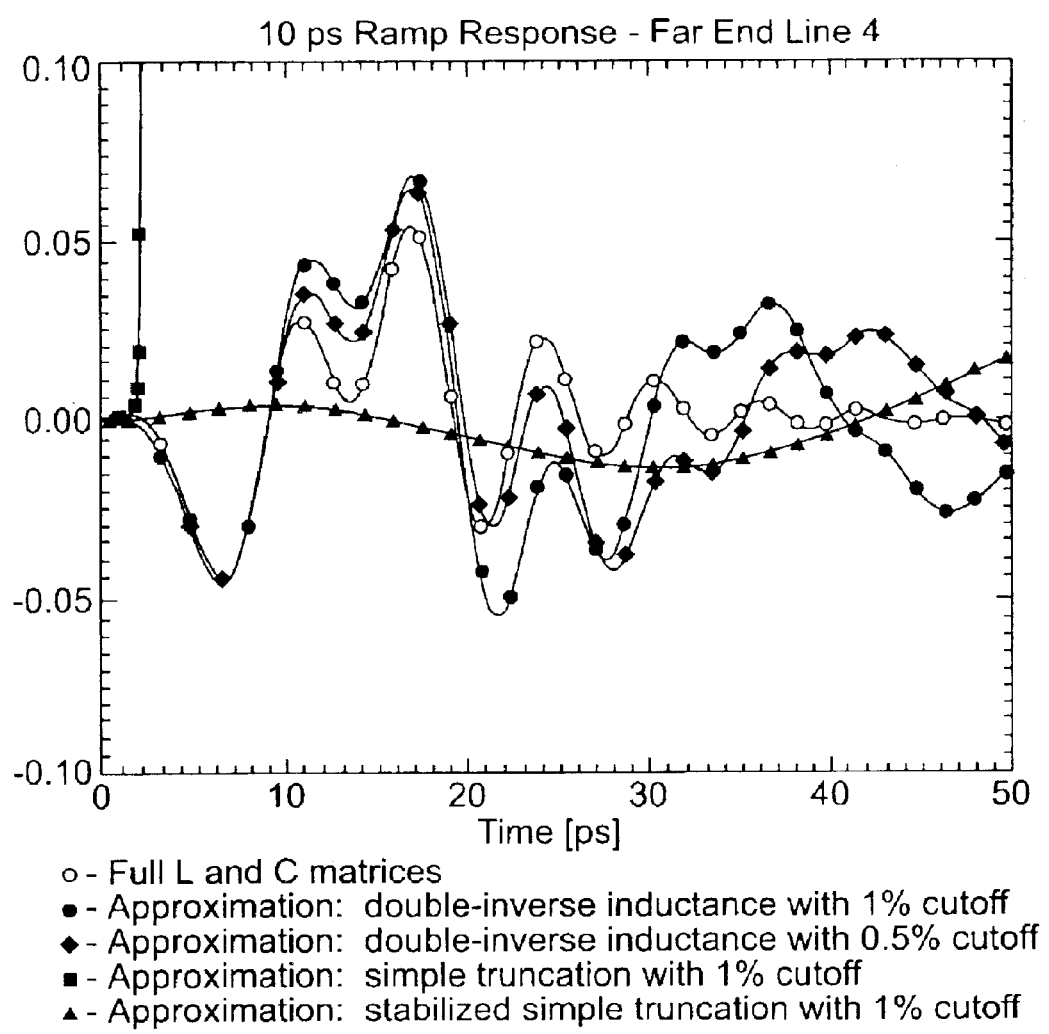

The resulting double-inverted partial inductance matrix generally contains far fewer significant elements than the original inductance matrix, which may make further sparsification of L easier as shown in FIG. 9, which illustrates the couplings of all bus lines through line 64 in the bus of FIG. 10. The solid line represents original partial inductance. The dotted line represents double-inverse L (all elements of susceptance matrix smaller than 1% of maximum were discarded). To preserve positive definiteness of the doubly inverted inductance matrix, the magnitude of off-diagonals, which were canceled during sparsification are added to the corresponding diagonal elements. It may be shown that this procedure preserves positive definiteness. A symmetric matrix $M_{ij}(p,q)$ is definite, which is +1 for i=j=p, and i=j=q, either +1 or −1 for both (i=pj=q) and (i=qj=p), and 0 everywhere else.

$x^T M(p,q)x$ is greater or equal to zero, which can be shown by explicitly calculating the expression. If a symmetric matrix A is positive definite, then the matrix $B = A + |A_{pq}|*M(p,q)$ must be positive definite as well. If the sign of the off-diagonals in M(p,q) is chosen to be opposite to the sign of $A_{pq}$, then $B_{pq} = B_{qp^*} = 0$.

Because most of the off-diagonal terms of the double-inverse inductance matrix are small (see FIG. 9) this procedure may provide positive definiteness of the resulting sparse double-inverse inductance matrix while not significantly changing the diagonal elements. The same cutoff percentage threshold for the double-inverse inductance matrix as for the susceptance matrix is used.

This sparse inductance model may efficiently and accurately represent magnetic interactions within interconnect without compromising stability. Examples will now be presented to demonstrate this approach.

EXAMPLES

A. Single layer 2×128 Bit Bus

FIG. 10 illustrates a bus consisting of two blocks of 128 lines (W 1 μM, H 2 μm, Sp 1 μm, L 1000 μm) with a 16 μm gap between the two blocks. The driver resistance $R_{Dr}$ is 70 Ω and the load capacitance $C_{Ld}$ is 2 fF. Every sixteenth line is a return line (no driver resistance).

In FIGS. 11A–11D the far end node voltage responses for two lines of the bus are shown for IV step and 10 ps ramp inputs. The far end response reduces in magnitude with increasing distance from the active line. The reference results (white circles) are obtained by including all individual couplings, which results in relatively high runtimes and memory consumption (see Table 1). Double-inverse inductance models are sparsified as described above, dependent on cutoff percentage (the smaller, the more accurate). For simple truncation, all off-diagonals are set to zero, which are zero for the double-inverse model with the given cutoff threshold to ensure fair comparison of the efficiency and accuracy of the different methods.

The waveforms for the double-inverse inductance localization method are relatively close to the corresponding reference results. The time interval containing the first few minima and maxima is captured relatively well by the double-inverse approximation leading to generally high accuracy for interconnect timing analysis. The runtime and memory requirements, however, are significantly smaller than for the reference case. Speedup factors are shown in Table 1.

It should be noted that the double-inverse inductance model is generally effective at higher frequencies, which is where inductive effects typically have the most impact and predominantly determine the ringing and overshoot for timing analysis. For lower frequencies, the damping of double-inverse is less; therefore, a low-amplitude, low-frequency oscillation around steady state remains while ringing is damped quicker for the reference result. Overall, the double-inverse inductance model shows relatively close agreement with the exact result.

For comparison, an attempt was made to generate a corresponding waveform using simple truncation on the original partial inductance. This, however, creates an ill-conditioned inductance model, which may lead to diverging waveforms. A more extensive study of this is available in M. Beattie, L. Pileggi, IC *Analyses Including Extracted Inductance Models*, 36$^{th}$ DAC (June 1999). This is observed in the results in FIGS. 11A–11D (squares), which coincide with the reference solution for about the first picosecond of simulation time, then diverge towards positive or negative infinity.

TABLE 1

Simulation cost comparison for 2 × 128 bit bus example in FIG. 10

| Symbols see FIGS. IIA–IID: | ○ | ● | ◆ | ■ | ▲ |
|---|---|---|---|---|---|
| Runtime (step) [s] | 17550 | 38 | 87 | 680 | 32 |
| Speedup Factor (step) | 1.0 | 460 | 200 | 26 | 550 |
| Runtime (ramp) [s] | 20050 | 41 | 87 | 530 | 30 |
| Speedup Factor (ramp) | 1.0 | 490 | 230 | 38 | 670 |
| Memory [MByte] | 112800 | 5760 | 10040 | 14510 | 5760 |
| Capacitance El. | 32481 | 3280 | 4823 | 3280 | 3280 |
| Inductance El. | 32896 | 4201 | 6392 | 4201 | 4201 |
| Sparsity [%] | 0.0 | 88.5 | 82.8 | 88.5 | 88.5 |

TABLE 1-continued

Simulation cost comparison for 2 × 128 bit bus example in FIG. 10

| Symbols see FIGS. IIA–IID: | ○ | ● | ◆ | ■ | ▲ |
|---|---|---|---|---|---|
| HSpice internal El. | 65890 | 7994 | 11728 | 19190 | 7994 |

It may be possible to avoid this stability problem by adding the truncated mutual partial inductances to the self-term, as described for the double-inverse inductance model above. Because the off-diagonal terms are significant in magnitude for the partial L matrix during simple truncation, this may grossly overestimate the magnetic self coupling, which may lead to lower response waveform frequencies and very low accuracy (triangles in FIGS. 11A–11D).

B. Three Layer Bus Structure

Figure 12:
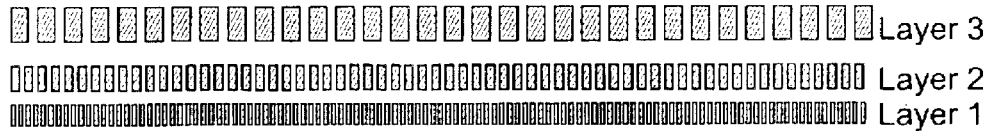
FIG. 12 is a diagram of an exemplary three-layer bus structure.
Figure 13A:
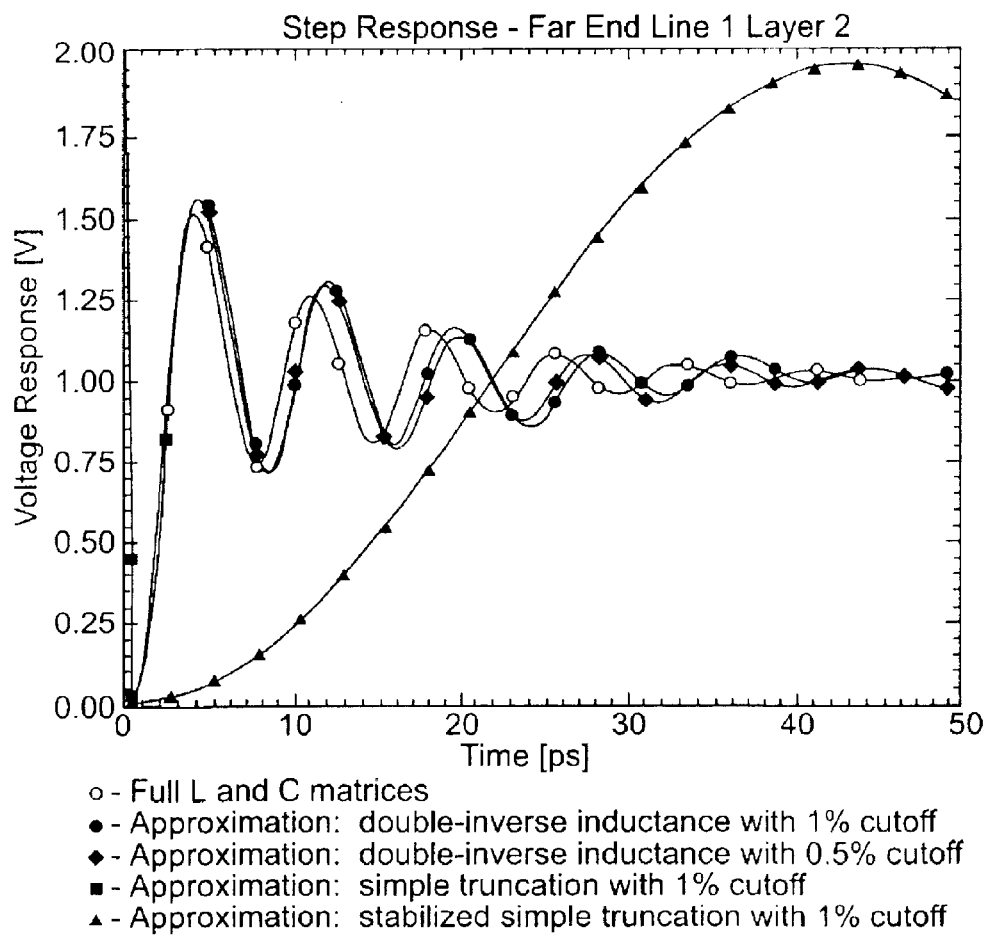
FIGS. 13A–13D are graphs that illustrate simulated voltage waveforms at lines one and four of the bus of FIG. 12 in response to a step input voltage and a ramp input voltage.
Figure 13B:
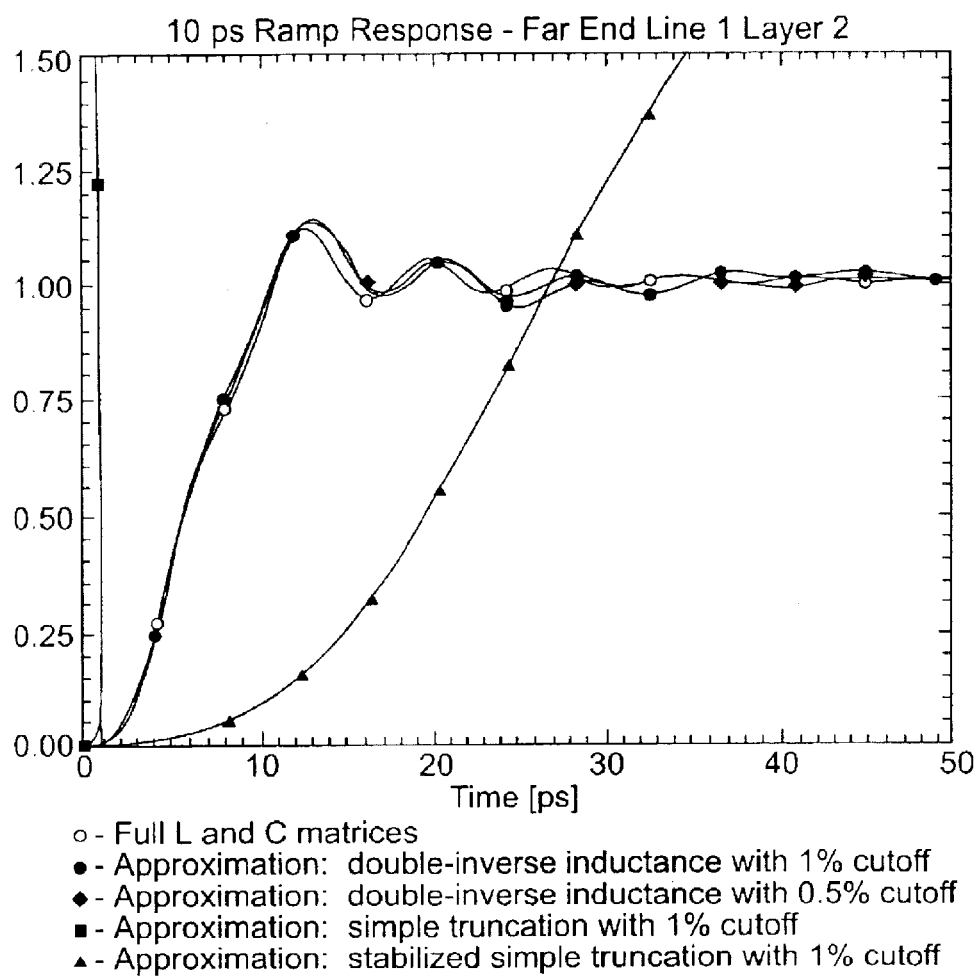
Figure 13C:
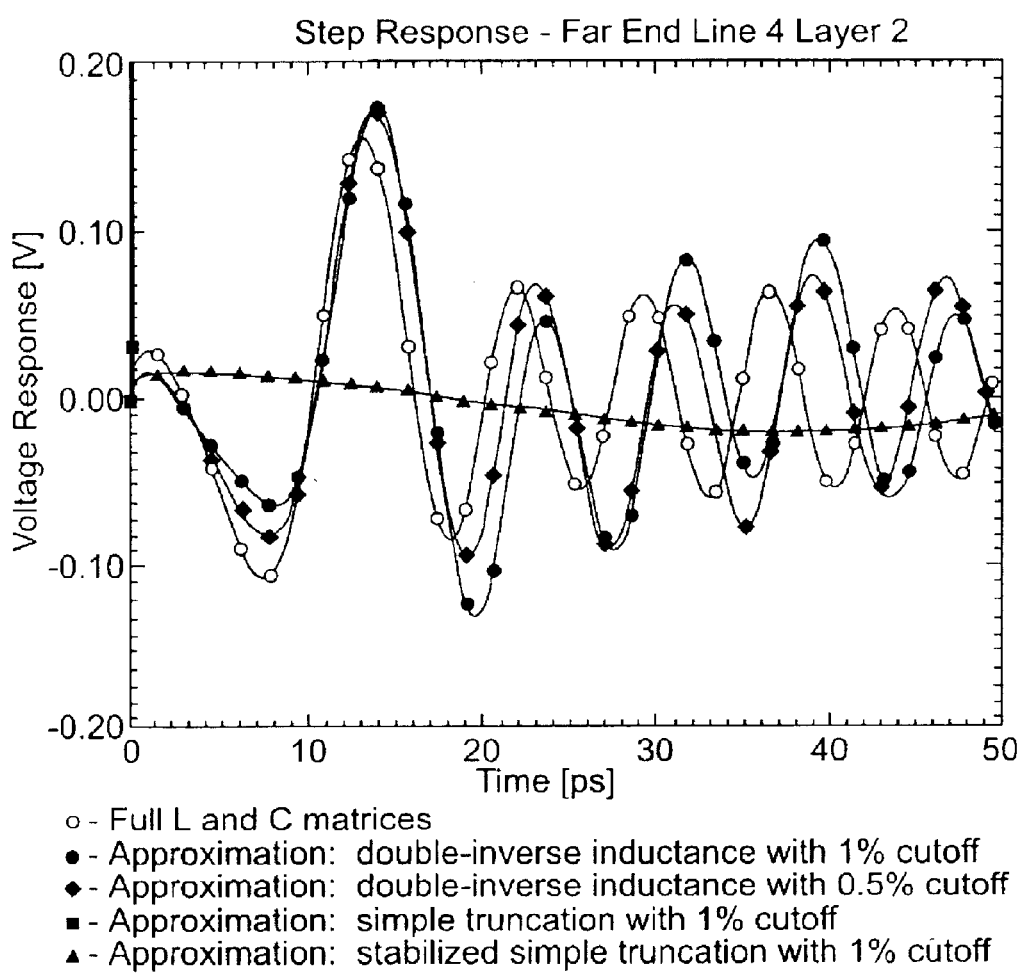
Figure 13D:
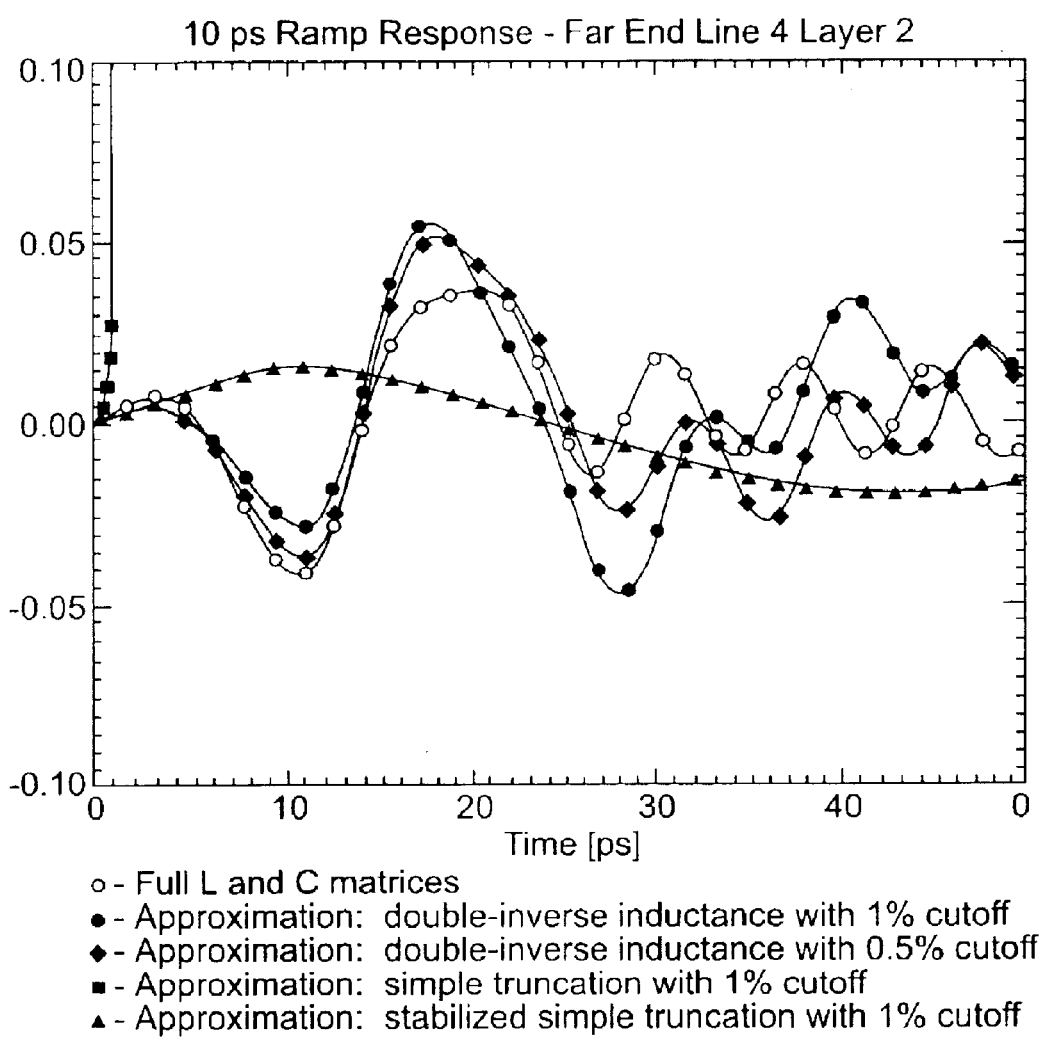

FIG. 12 illustrates three parallel bus structures with the leftmost wire of the middle layer being active. All wires are 1000 μm long (cross-section in FIG. 12). Layer 1: W 1 μm, H 2 μm, Sp 1 μm, $R_{Dr}$ 70 Ω, $C_{Ld}$ 2 fF. Layer 2: W 3 μm, H 2 μM, Sp 1 μm, $R_{Dr}$ 50 Ω, $C_{Ld}$ 2 fF. Layer 3: W 6 μm, H 3 μm, Sp 2 μm, $R_{Dr}$ 25 Ω, $C_{Ld}$ fF. Every eighth line is a return line.

The advantage of the double-inverse model over the simple truncation approach may be seen in the results for this example, shown in FIGS. 13A–13D. The observations from the previous example also apply in this case.

The presence of interconnects above and below the layer in which the active line is placed increases the number of wires to which coupling is significant for accurate simulation. Therefore, for the same cutoff threshold values, the sparsity of the approximation models is lower than for the single layer example. Because, however, the total number of conductors is smaller than for the 2×128 bit bus example, the runtimes and memory consumption are also smaller, as shown in Table 2.

Due to the higher density of surrounding conductors for each wire and the resulting lower sparsity of the inductance approximations, the speedup across the board is lower than for the previous example, but still significant.

TABLE 2

Simulation cost comparison for three-layer bus example in FIG. 12

| Symbols see FIGS. 13A–13D: | ○ | ● | ◆ | ■ | ▲ |
|---|---|---|---|---|---|
| Runtime (step) [s] | 9390 | 72 | 310 | 1700 | 43 |
| Speedup Factor (step) | 1.0 | 130 | 30 | 5.5 | 220 |
| Runtime (ramp) [s] | 8950 | 75 | 310 | 1790 | 45 |
| Speedup Factor (ramp) | 1.0 | 120 | 29 | 5.0 | 200 |
| Memory [MByte] | 87230 | 7650 | 16070 | 29150 | 7650 |
| Capacitance El. | 25424 | 3125 | 4662 | 3125 | 3125 |
| Inductance El. | 25200 | 6962 | 12459 | 6962 | 6962 |

TABLE 2-continued

Simulation cost comparison for three-layer bus example in FIG. 12

| Symbols see FIGS. 13A–13D: | ○ | ● | ◆ | ■ | ▲ |
|---|---|---|---|---|---|
| Sparsity [%] | 0.0 | 80.0 | 66.1 | 80.0 | 80.0 |
| HSpice internal El. | 51073 | 10536 | 17570 | 27620 | 10536 |

As discussed above with respect to block 210 of FIG. 2, it is possible to integrate susceptance directly into simulation models, in accordance with embodiments of the present invention. The following section describes exemplary procedures for including susceptance in an MNA based simulator.

Modeling Inductive Effects Via Susceptance

Figure 14:
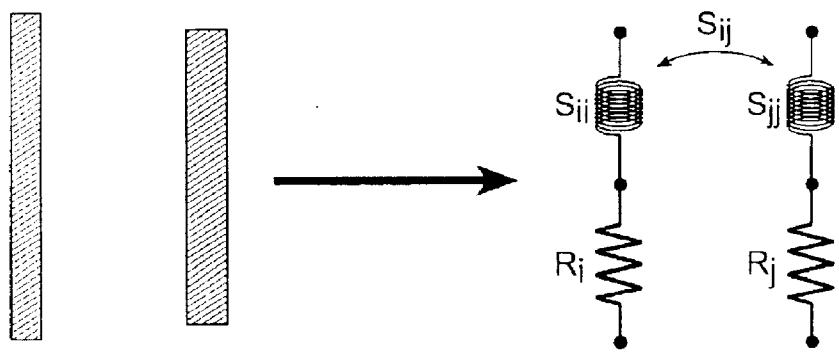
FIG. 14 is a diagram that illustrates a single stage resistance-susceptance model for two magnetically coupled segments.
Figure 15:
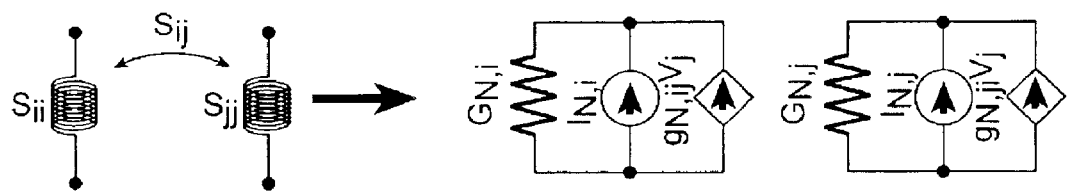
FIG. 15 is a diagram that illustrates a Norton companion model for two coupled self-susceptance elements.

Susceptance S and resistance R of a segment are connected in series as shown in FIG. 14. In the following section, Norton companion models for susceptance elements for backward Euler and trapezoidal time integration within a circuit simulation tool will be derived. FIG. 15 shows the schematic for the Norton equivalents for two coupled self-susceptance elements.

A difference between susceptance and inductance models from a circuit perspective is that mutual susceptances contribute voltage-controlled sources to the companion models, rather than current controlled sources as for the mutual inductors. Therefore, susceptance models may take into account the impact of floating conductors for inductive effects. These floating conductors are "invisible" to inductance models due to the lack of current flowing in them, which may lead to inaccuracies.

According to embodiments of the present invention, the derivation of the susceptance companion models begins with the current-voltage relationships for the susceptances involved. Equation 15

$$\partial_t I_i = S_{ii} V_i + S_{ij} V_j \tag{15}$$

may be established by inverting the corresponding and well-known relation for inductive couplings set forth in Equation 16 below:

$$V_i = L_{ii} \partial_t I_i + L_{ij} \partial_t I_j \tag{16}$$

Note that Equations 15 and 16 represent 2×2 matrix equations and can be readily generalized for N×N systems. For numerical time integration Equation 15 is discretized over the continuous time t by integrating the equation over one time step as set forth in Equation 17 below:

$$I_i(t+\Delta t) - I_i(t) = S_{ii} \int_t^{\tau=\Delta t} V_i(\tau) + S_{ij} \int_t^{\tau=\Delta t} V_j(\tau) \tag{17}$$

On the left hand side of Equation 17, the integration of the time derivative of the induced current in segment i leads to a difference expression of the current at the two adjacent time points. This leads to the Norton current equation set forth below as Equation 18:

$$I_i(t+\Delta t) = I_i(t) + S_{ii} \int_t^{\tau=\Delta t} V_i(\tau) + S_{ij} \int_t^{\tau=\Delta t} V_j(\tau) \tag{18}$$

If the voltage integrals in Equation 18 are approximated by the voltage values at the later time point as expressed by Equation 19 below:

$$\int_t^{\tau=\Delta t} V_i(\tau) \approx \Delta t V_i(t+\Delta t) \tag{19}$$

then the Norton equation for backward Euler time integration may be given by Equation 20 below:

$$I_i(t+\Delta t) = I_i(t) + S_{ii}\Delta t\, V_i(t+\Delta t) + S_{ij}\Delta v_j(t+\Delta t) \tag{20}$$

In Equation 20, each term on the right hand side maps to elements in the Norton equivalent model shown in FIG. 15. The resulting coefficients for the conductance and the current sources are given for backward Euler time integration by Equation 21 below:

$$G_{N,i} = S_{ii}\Delta t;\quad I_{N,i} = I_i(t);\quad gN,\, ij = S_{ij}\Delta t \tag{21}$$

If the voltage integrals in Equation 18 are approximated by the average of the voltage values at both time points as expressed in Equation 22 below:

$$\int_t^{\tau=\Delta t} V_i(\tau) \approx \frac{\Delta t}{2}[V_i(t+\Delta t) + V_i(t)] \tag{22}$$

then the Norton equation for trapezoidal time integration is given by Equation 23 below:

$$I_i(t+\Delta t) = \left[I_i(t) + \frac{S_{ii}\Delta t}{2}V_i(t) + \frac{S_{ij}\Delta t}{2}V_j(t)\right] + \frac{S_{ii}\Delta t}{2}V_i(t+\Delta t) + \frac{S_{ii}\Delta t}{2}V_j(t+\Delta t) \tag{23}$$

In Equation 23, each term on the right hand side maps to elements in the Norton equivalent model shown in FIG. 15. The resulting coefficients for the conductance and the current sources are for the trapezoidal rule given by Equation 24 below:

$$G_{N,i} = \frac{\Delta t}{2}S_{ii};$$

$$I_{N,i} = I_i(t) + \frac{\Delta t}{2}[S_{ii}V_i(t) + S_{ij}V_j(t)];\quad g_{N,ij} = \frac{\Delta t}{2}S_{ij} \tag{24}$$

Figure 16:
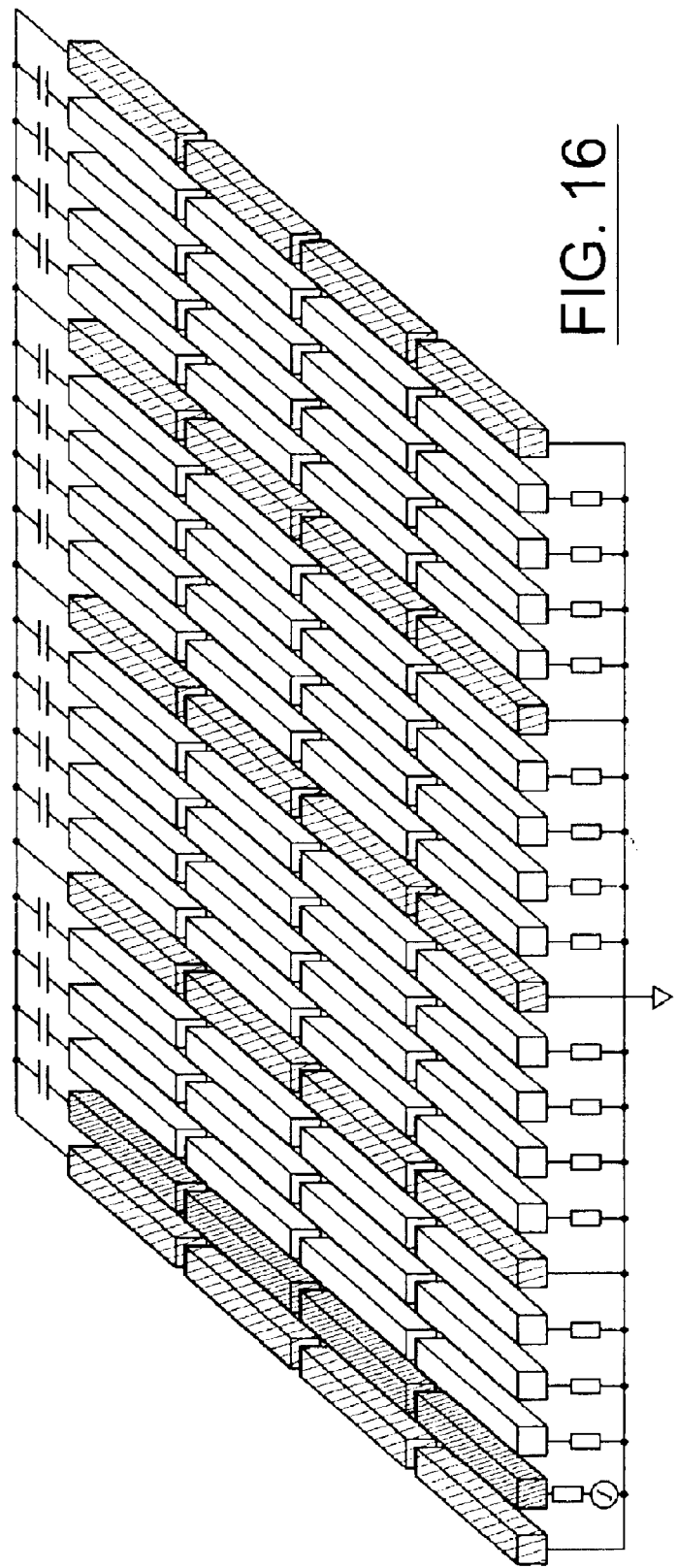
FIG. 16 is a diagram that illustrates an exemplary 16-bit bus that is subdivided into four segments.

Implementing this in a prototype Matlab simulator, the stability of the truncated susceptance model may be demonstrated where the truncated inductance model is unstable. The simulated example is a 16-bit bus structure with each line subdivided into four segments as shown in FIG. 16. Driver resistance is 50 Ω and the load capacitance is 2 fF for all signal lines. Add lines are 1 mm wide and 1 mm thick with 1 mm spacing. Each segment is 800 mm long.

Figure 17A:
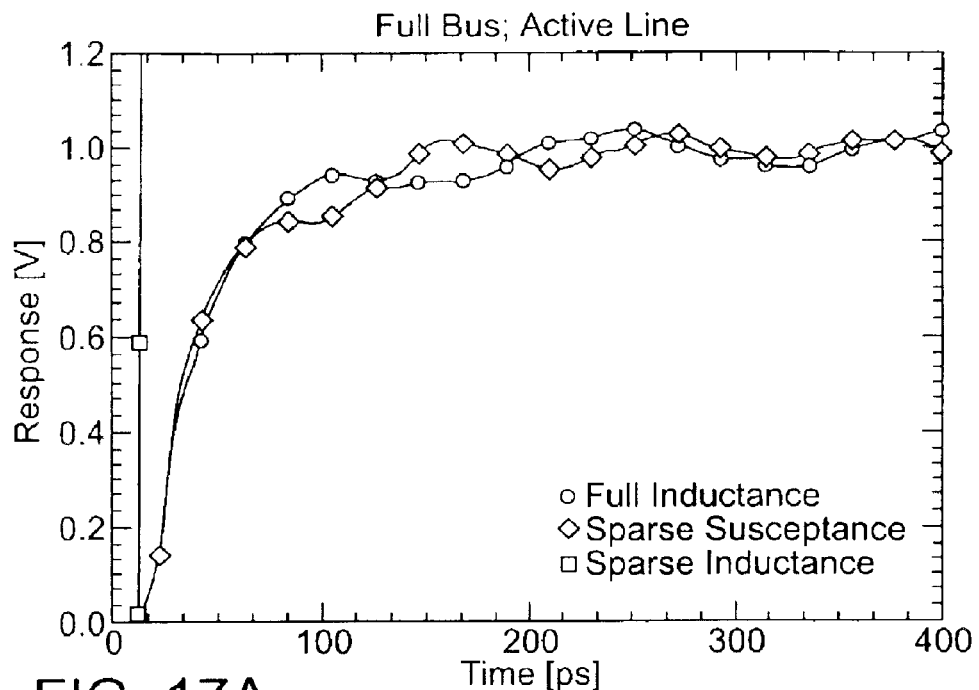
FIGS. 17A–17B are graphs that illustrate voltage waveforms at an active line and its "quiet" neighbor for the bus of FIG. 16.
Figure 17B:
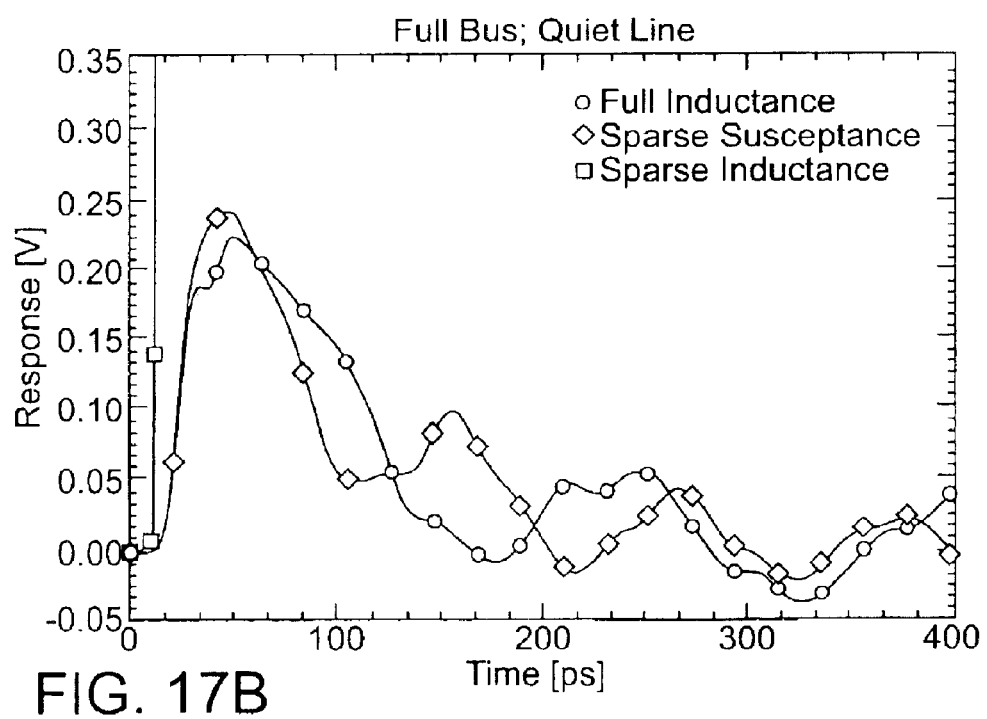

The simulation results for the far end of the active and the first "quiet" line are shown in FIGS. 17A and 17B. The results for the susceptance model match the reference result relatively well. For the sparse susceptance model we all mutual elements mutual elements, except those to the nearest neighbors orthogonal to the current direction maximum of two neighbors for each segment), have been discarded. The runtime for the sparse model, however, may also be reduced as shown in Table 3 below:

TABLE 3

Performance Comparison for Floating Bus Lines of FIG. 16

| Symbols see FIGS. 17A and 17B | ○ | ◊ | □ |
|---|---|---|---|
| Runtime (s) | 1355 | 378 | 325 |
| Inductance/Susceptance El | 3570 | 164 | 164 |
| Inductance/Susceptance Sparsity % | 0.0 | 99.6 | 99.6 |

If the corresponding inductance model for the inductive interactions is sparsified as susceptance model was sparsified, then it has been found that the resulting approximate circuit is unstable and leads to exponentially increasing results, which are unphysical.

Figure 18:
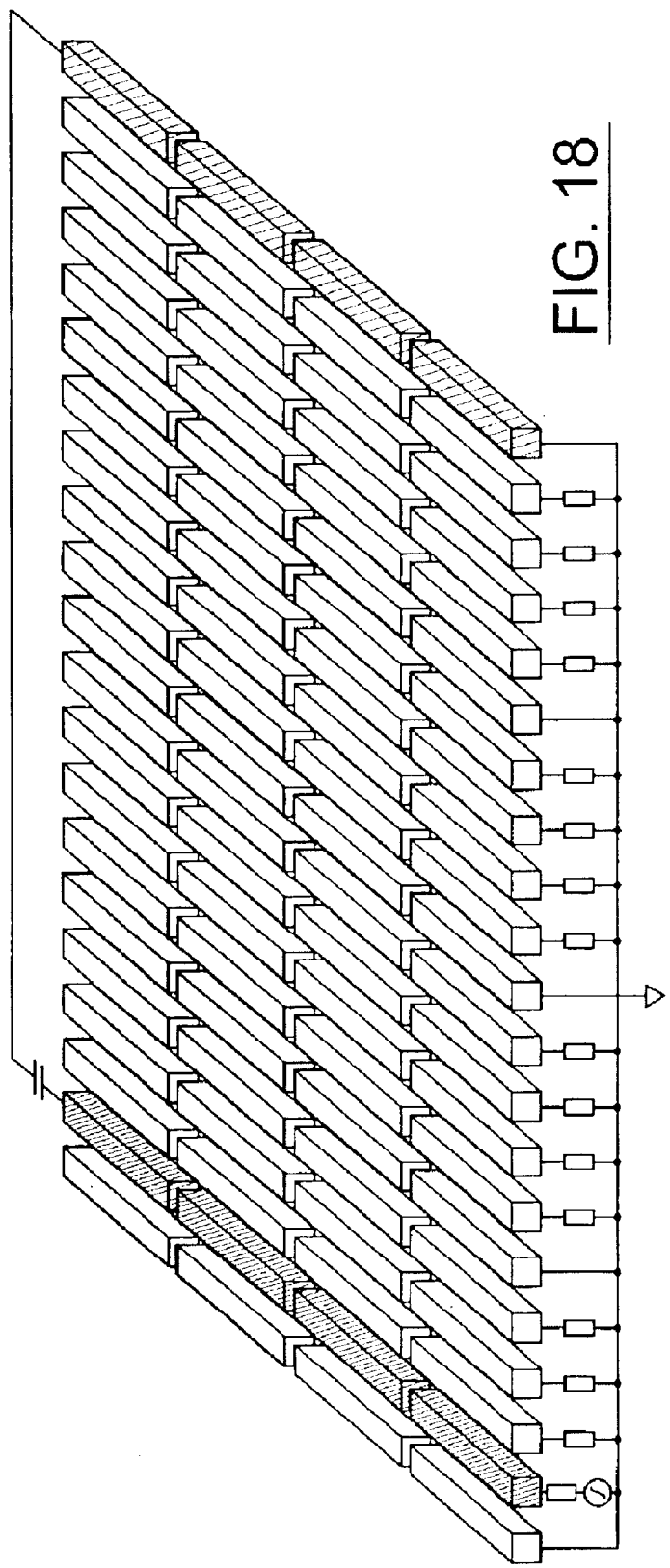
FIG. 18 is a diagram that illustrates an exemplary 16-bit bus that includes one active line, one return line, and multiple other lines in a floating state.
Figure 19A:
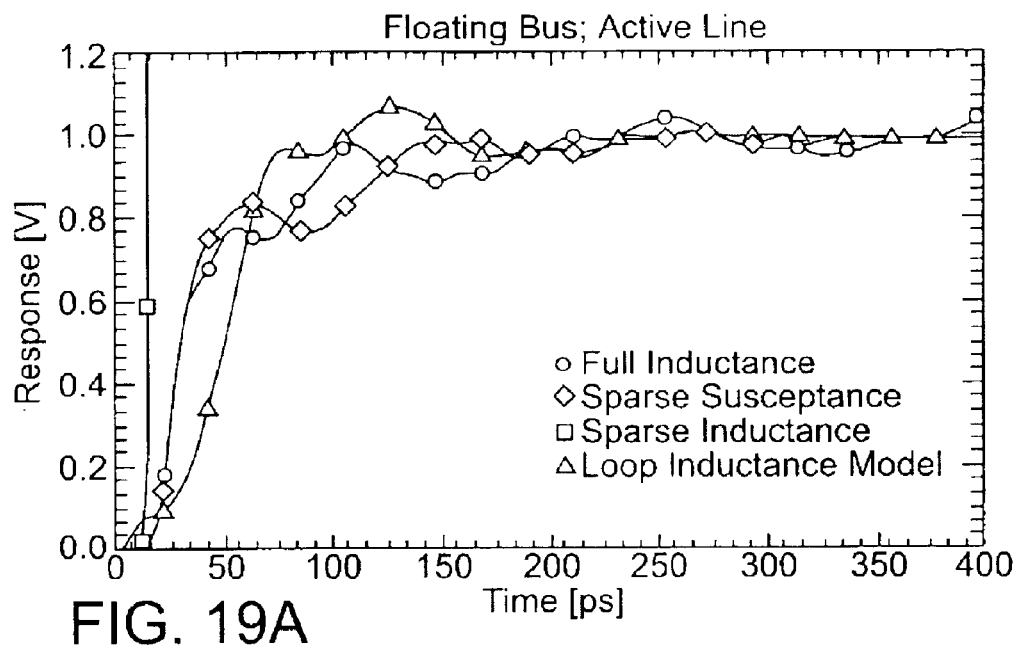
FIGS. 19A–19B are graphs that illustrate voltage waveforms at an active line and its floating neighbor for the bus of FIG. 18.
Figure 19B:
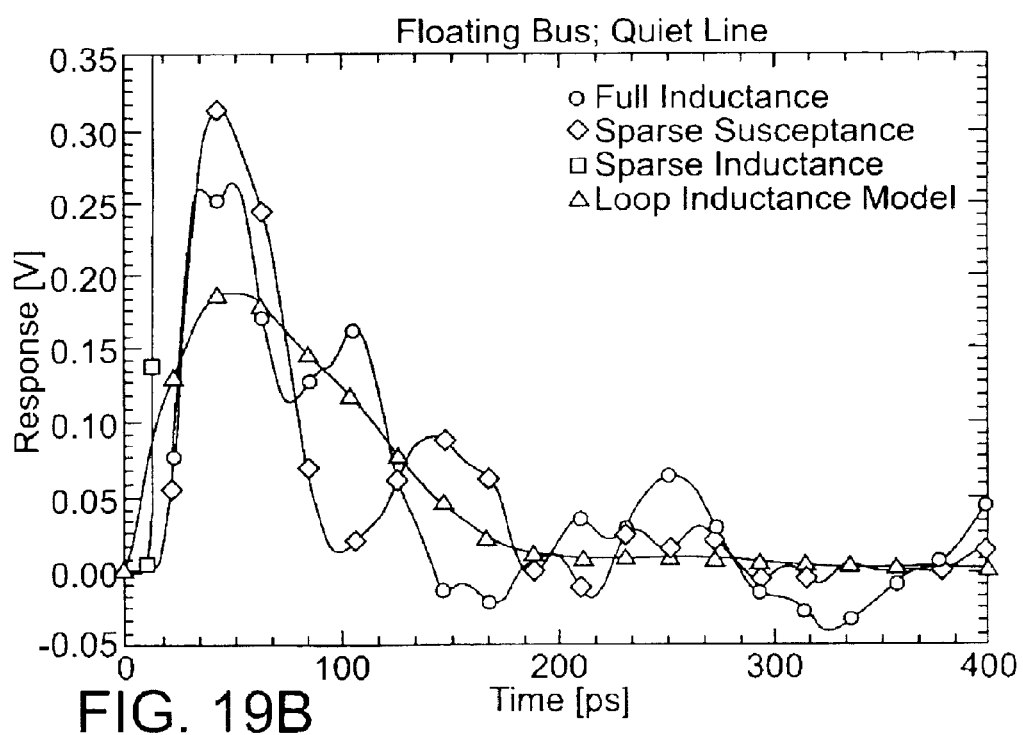

Another advantage of susceptance models for inductive effects is the inclusion of indirect coupling effects within structures of many conductors even if the direct couplings between far-away conductors have been ignored. To illustrate this effect, the circuit in FIG. 16 is analyzed with all lines except the active line and the rightmost return line floating, which is illustrated in FIG. 18. In addition to the full inductance model and the sparse susceptance and inductance models, the results for a simple loop inductance model are also included in the plots of FIGS. 19A and 19B. For this approximation, magnetic interactions are modeled by partial inductance, but only self and mutual elements involving either the active or the return line are included. This model is very sparse as indicated by Table 4 below, but as shown in FIGS. 19A and 19B, the results are not as accurate as for the susceptance model, which is only marginally larger and has a comparable runtime. Sparsifying the original inductance model in a similar manner as for the previous example again leads to instabilities.

TABLE 4

Performance Comparison for Floating Bus Lines of FIG. 18

| Symbols see FIGS. 19A and 19B | ○ | ◊ | □ | Δ |
|---|---|---|---|---|
| Runtime (s) | 1345 | 359 | 327 | 347 |
| Inductance/Susceptance El | 3570 | 164 | 164 | 112 |
| Inductance/Susceptance Sparsity % | 0.0 | 99.6 | 99.6 | 99.7 |

Figure 20:
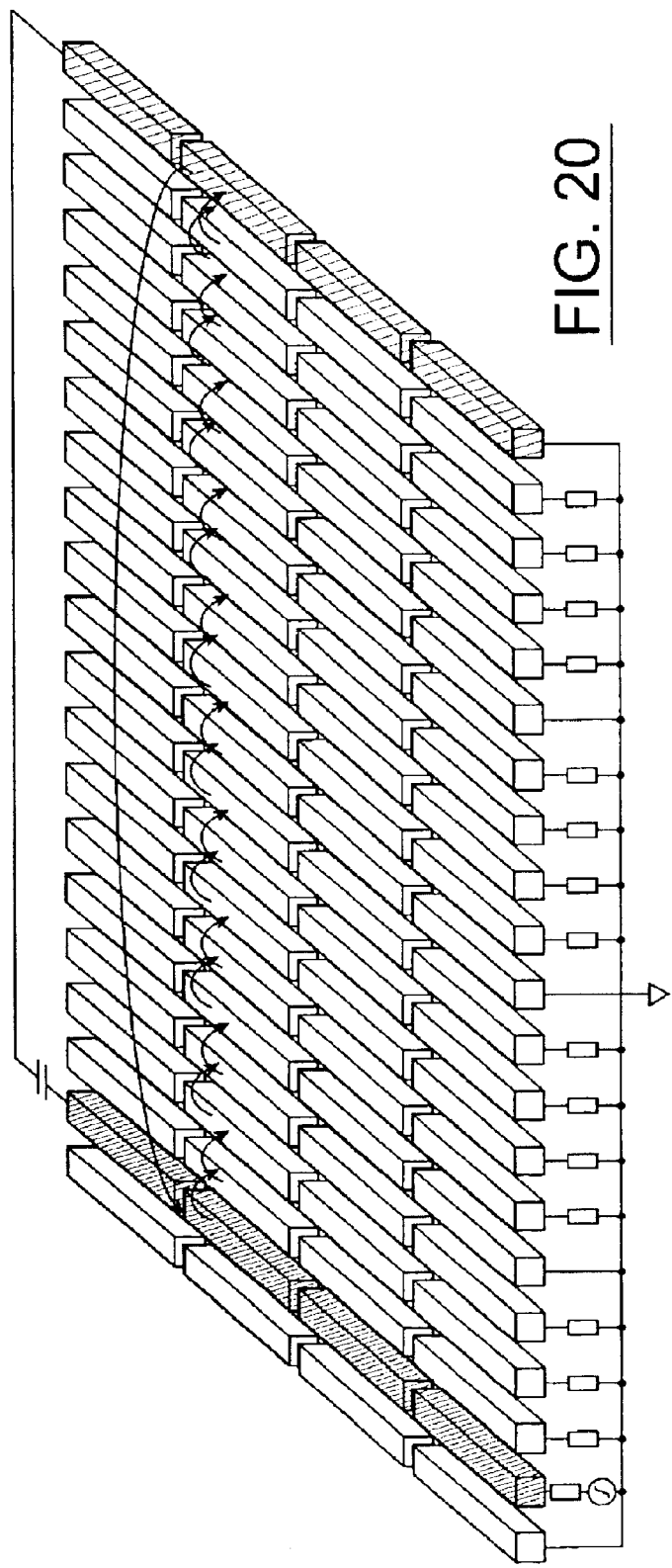
FIG. 20 is a diagram that illustrates indirect and direct coupling effects in an exemplary 16-bit bus.

The reason for this is that the loop inductance model does not include the indirect magnetic coupling mechanism between the active and the return line provided by the floating lines in between while the susceptance model includes this as illustrated in FIG. 20 where the long arrow illustrates direct coupling effects and the short arrows illustrate indirect coupling effects. Since the off-diagonal terms of the full susceptance matrix represent the remaining effective coupling between two conductors after shielding by the lines in between have been factored out, discarding these small terms does not remove the indirect coupling between these lines as represented by the shielding through the lines in between. For the loop inductance model, however, all the couplings for the floating lines are discarded—they are effectively invisible to magnetic fields for this approximation. Because both the direct coupling between the active and return line (which is insignificant) and also the indirect coupling via the intermediate lines (which is not insignificant) are discarded, a larger error is incurred, which is visible in the plots of FIGS. 19A and 19B showing a roughly 50% larger delay for the loop inductance model compared to the reference case, while the susceptance approximation is nearly as efficient, but more accurate.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of modeling inductive effects in an integrated circuit/system that comprises a plurality of conductors, the method comprising:

defining a plurality of windows, respective ones of the plurality of windows being associated with respective ones of the plurality of conductors and having other ones of the plurality of conductors contained therein: and forming a plurality of localized susceptive coupling vectors, respective ones of the plurality of localized susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero, combining the plurality of localized susceptive coupling vectors into a susceptance coupling matrix, and transforming the susceptance coupling matrix so that the susceptance coupling matrix is symmetrical, comprising:

comparing a first susceptive coupling element determined for a first one of the plurality of conductors with respect to a second one of the plurality of conductors with a second susceptive coupling element determined for the second one of the plurality of conductors with respect to the first one of the plurality of conductors;

selecting one of the first and the second susceptive coupling elements having a smallest magnitude; and replacing the non-selected susceptive coupling element with the selected susceptive coupling element in the susceptance coupling matrix.

2. The method of claim 1, wherein defining the plurality of windows comprises:

forming a localized inductance matrix for the respective ones of the plurality of conductors associated with the respective ones of the plurality of windows based on the respective other ones of the plurality of conductors contained in the respective ones of the plurality of windows.

3. A method of modeling inductive effects in an integrated circuit/system that comprises a plurality of conductors, the method comprising:

defining a plurality of windows, respective ones of the plurality of windows being associated with respective ones of the plurality of conductors and having other ones of the plurality of conductors contained therein; and forming a plurality of localized susceptive coupling vectors, respective ones of the plurality of localized susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

combining the plurality of localized susceptive coupling vectors into a susceptance coupling matrix;

transforming the susceptance coupling matrix so that the susceptance coupling matrix is symmetrical;

sparsifying the susceptance coupling matrix so as to cancel a susceptive coupling element; and adding a magnitude of the canceled susceptive coupling element to respective diagonal elements in the susceptance coupling matrix at rows and columns corresponding to ones of the plurality of conductors between which the canceled susceptive coupling element was determined.

4. The method of claim 3, further comprising:

using the susceptance coupling matrix in a susceptance-based circuit simulator.

5. A method of modeling inductive effects in an integrated circuit/system that comprises a plurality of conductors, the method comprising:

defining a plurality of windows, respective ones of the plurality of windows being associated with respective ones of the plurality of conductors and having other ones of the plurality of conductors contained therein; and forming a plurality of localized susceptive coupling vectors, respective ones of the plurality of localized susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

combining the plurality of localized susceptive coupling vectors into a susceptance coupling matrix;

transforming the susceptance coupling matrix so that the susceptance coupling matrix is symmetrical;

inverting the susceptance coupling matrix to obtain an inductance coupling matrix;

sparsifying the inductance coupling matrix so as to cancel an inductive coupling element; and adding a magnitude of the canceled inductive coupling element to respective diagonal elements in the inductance coupling matrix at rows and columns corresponding to ones of the plurality of conductors between which the the canceled inductive coupling element was determined.

6. The method of claim 5, further comprising:

using the inductance coupling matrix in an inductance-based circuit simulator.

7. A method of modeling inductive effects in an integrated circuit/system that comprises a plurality of conductors, the method comprising:

defining a plurality of windows, respective ones of the plurality of windows being associated with respective ones of the plurality of conductors and having other ones of the plurality of conductors contained therein; and forming a plurality of localized susceptive coupling vectors, respective ones of the plurality of localized susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

combining the plurality of localized susceptive coupling vectors into a susceptance coupling matrix; and transforming the susceptance coupling matrix so that the susceptance coupling matrix is symmetrical;

wherein defining a plurality of windows comprises:

increasing respective sizes for respective ones of the plurality of windows so as to contain additional other ones of the plurality of conductors until susceptive coupling elements for the additional other ones of the plurality of conductors are less than a threshold that is approximately 1% of respective self-term susceptive coupling element magnitudes corresponding to the respective ones of the plurality of conductors associated with the respective ones of the plurality of windows.

8. A method of modeling inductive effects in an integrated circuit/system that comprises a plurality of conductors, the method comprising:

forming a first localized inductance matrix for a first portion of the circuit and a second localized inductance matrix for a second portion of the circuit, the first and second localized inductance matrices being associated with first and second ones of the plurality of conductors, respectively;

solving the first and second localized inductance matrices to obtain first and second localized susceptance vectors; and combining the first and second localized susceptance vectors to obtain a susceptance matrix, comprising:

comparing a first susceptive coupling element in the first localized susceptance vector determined for the first one of the plurality of conductors with respect to a second one of the plurality of conductors with a second susceptive coupling element in the second localized susceptance vector determined for the second one of the plurality of conductors with respect to the first one of the plurality of conductors;

selecting one of the first and the second susceptive coupling elements having a smallest magnitude; and replacing the non-selected susceptive coupling element with the selected susceptive coupling element in the susceptance matrix.

9. The method of claim 8, wherein the first and second localized inductance matrices are associated with first and second ones of the plurality of conductors, respectively, and wherein solving the first and second localized inductance matrices comprises:

determining respective currents flowing through other ones of the plurality of conductors contained in a first window surrounding the first one of the plurality of conductors such that the first one of the plurality of conductors has a respective total magnetic flux of unity and the other ones of the plurality of conductors contained in the first window have respective total magnetic fluxes of zero; and determining respective currents flowing through other ones of the plurality of conductors contained in a second window surrounding the second one of the plurality of conductors such that the second one of the plurality of conductors has a respective total magnetic flux of unity and the other ones of the plurality of conductors contained in the second window have respective total magnetic fluxes of zero.

10. The method of claim 8, further comprising:

sparsifying the susceptance matrix so as to cancel a susceptive coupling element; and adding a magnitude of the canceled susceptive coupling element to respective diagonal elements in the susceptance matrix at rows and columns corresponding to ones of the plurality of conductors between which the canceled susceptive coupling element was determined.

11. The method of claim 8, further comprising:

using the susceptance matrix in a susceptance-based circuit simulator.

12. The method of claim 8, further comprising:

inverting the susceptance matrix to obtain an inductance matrix.

13. The method of claim 12, further comprising:

sparsifying the inductance matrix so as to cancel an inductive coupling element; and adding a magnitude of the canceled inductive coupling element to respective diagonal elements in the inductance matrix at rows and columns corresponding to ones of the plurality of conductors between which the the canceled inductive coupling element was determined.

14. The method of claim 12, further comprising:

using the inductance matrix in an inductance-based circuit simulator.

15. A system for modeling inductive effects in an integrated circuit/system that comprises a plurality of conductors, comprising:

means for defining a plurality of windows respective ones of the plurality of windows being associated with respective ones of the plurality of conductors and having other ones of the plurality of conductors contained therein; and means for forming a plurality of localized susceptive coupling vectors, respective ones of the susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

means for combining the plurality of localized susceptive coupling vectors into a susceptance coupling matrix; and means for transforming the susceptance coupling matrix so that the susceptance coupling matrix is symmetrical, comprising:

means for comparing a first susceptive coupling element determined for a first one of the plurality of conductors with respect to a second one of the plurality of conductors with a second susceptive coupling element determined for the second one of the plurality of conductors with respect to the first one of the plurality of conductors;

means for selecting one of the first and the second susceptive coupling elements having a smallest magnitude; and means for replacing the non-selected susceptive coupling element with the selected susceptive coupling element in the susceptance coupling matrix.

16. The system of claim 15, wherein the means for defining the plurality of windows comprises:

means for forming a localized inductance matrix for the respective ones of the plurality of conductors associated with the respective ones of the plurality of windows based on the respective other ones of the plurality of conductors contained in the respective ones of the plurality of windows.

17. A system for modeling inductive effects in an integrated circuit/system that comprises a plurality of conductors, comprising:

means for defining a plurality of windows, respective ones of the plurality of windows being associated with respective ones of the plurality of conductors and having other ones of the plurality of conductors contained therein: and means for forming a plurality of localized susceptive coupling vectors, respective ones of the susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

means for combining the plurality of localized susceptive coupling vectors into a susceptance coupling matrix;

means for transforming the susceptance coupling matrix so that the susceptance coupling matrix is symmetrical;

means for sparsifying the susceptance coupling matrix so as to cancel a susceptive coupling element; and means for adding a magnitude of the canceled susceptive coupling element to respective diagonal elements in the susceptance coupling matrix at rows and columns corresponding to ones of the plurality of conductors between which the canceled susceptive coupling element was determined.

18. The system of claim 17, further comprising:

means for using the susceptance coupling matrix in a susceptance-based circuit simulator.

19. A system for modeling inductive effects in an integrated circuit/system that comprises a plurality of conductors, comprising:

means for defining a plurality of windows, respective ones of the plurality of windows being associated with respective ones of the plurality of conductors and having other ones of the plurality of conductors contained therein; and means for forming a plurality of localized susceptive coupling vectors, respective ones of the susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

means for combining the plurality of localized susceptive coupling vectors into a susceptance coupling matrix;

means for transforming the susceptance coupling matrix so that the susceptance coupling matrix is symmetrical;

means for inverting the susceptance coupling matrix to obtain an inductance coupling matrix;

means for sparsifying the inductance coupling matrix so as to cancel an inductive coupling element; and means for adding a magnitude of the canceled inductive coupling element to respective diagonal elements in the inductance coupling matrix at rows and columns corresponding to ones of the plurality of conductors between which the the canceled inductive coupling element was determined.

20. The system of claim 19, further comprising:

means for using the inductance coupling matrix in an inductance-based circuit simulator.

21. A system for modeling inductive effects in an integrated circuit/system that comprises a plurality of conductors, comprising:

means for defining a plurality of windows, respective ones of the plurality of windows being associated with respective ones of the plurality of conductors and having other ones of the plurality of conductors contained therein; and means for forming a plurality of localized susceptive coupling vectors, respective ones of the susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

means for combining the plurality of localized susceptive coupling vectors into a susceptance coupling matrix;

means for transforming the susceptance coupling matrix so that the susceptance coupling matrix is symmetrical;

wherein the means for defining a plurality of windows comprises:

means for increasing respective sizes for respective ones of the plurality of windows so as to contain additional other ones of the plurality of conductors until susceptive coupling elements for the additional other ones of the plurality of conductors are less than a threshold that is approximately 1% of respective self-term susceptive coupling element magnitudes corresponding to the respective ones of the plurality of conductors associated with the respective ones of the plurality of windows.

22. A system for modeling inductive effects in an integrated circuit/system that comprises a plurality of conductors, comprising:

means for forming a first localized inductance matrix for a first portion of the circuit and a second localized inductance matrix for a second portion of the circuit, the first and second localized inductance matrices being associated with first and second ones of the plurality of conductors, respectively;

means for solving the first and second localized inductance matrices to obtain first and second localized susceptance vectors; and means for combining the first and second localized susceptance vectors to obtain a at susceptance matrix, the means for combining comprising:

means for comparing a first susceptive coupling element in the first localized susceptance vector determined for the first one of the plurality of conductors with respect to a second one of the plurality of conductors with a second susceptive coupling element in the second localized susceptance vector determined for the second one of the plurality of conductors with respect to the first one of the plurality of conductors;

means for selecting one of the first and the second susceptive coupling elements having a smallest magnitude; and means for replacing the non-selected susceptive coupling element with the selected susceptive coupling element in the susceptance matrix.

23. The system of claim 22, wherein the first and second localized inductance matrices are associated with first and second ones of the plurality of conductors, respectively, and wherein the means for solving the first and second localized inductance matrices comprises:

means for determining respective currents flowing through other ones of the plurality of conductors contained in a first window surrounding the first one of the plurality of conductors such that the first one of the plurality of conductors has a respective total magnetic flux of unity and the other ones of the plurality of conductors contained in the first window have respective total magnetic fluxes of zero; and means for determining respective currents flowing through other ones of the plurality of conductors contained in a second window surrounding the second one of the plurality of conductors such that the second one of the plurality of conductors has a respective total magnetic flux of unity and the other ones of the plurality of conductors contained in the second window have respective total magnetic fluxes of zero.

24. The system of claim 22, further comprising:

means for sparsifying the susceptance matrix so as to cancel a susceptive coupling element; and means for adding a magnitude of the canceled susceptive coupling element to respective diagonal elements in the susceptance matrix at rows and columns corresponding to ones of the plurality of conductors between which the canceled susceptive coupling element was determined.

25. The system of claim 22, further comprising:

means for using the susceptance matrix in a susceptance-based circuit simulator.

26. The system of claim 22, further comprising:

means for inverting the susceptance matrix to obtain an inductance matrix.

27. The system of claim 26, further comprising:

means for sparsifying the inductance matrix so as to cancel an inductive coupling element; and means for adding a magnitude of the canceled inductive coupling element to respective diagonal elements in the inductance matrix at rows and columns corresponding to ones of the plurality of conductors between which the canceled inductive coupling element was determined.

28. The system of claim 26, further comprising:

means for using the inductance matrix in an inductance-based circuit simulator.

29. A computer program product for modeling inductive effects in an integrated circuit/system that comprises a plurality of conductors, comprising:

a computer readable program medium having computer readable program code embodied therein, the computer readable program code comprising:

computer readable program code that is configured to define a plurality of windows, respective ones of the plurality of windows being associated with respective ones of the plurality of conductors and having other ones of the plurality of conductors contained therein; and computer readable program code that is configured to form a plurality of localized susceptive coupling vectors, respective ones of the susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

computer readable program code configured to combine the plurality of localized susceptive coupling vectors into a susceptance coupling matrix; and computer readable program code configured to transform the susceptance coupling matrix so that the susceptance coupling matrix is symmetrical, comprising:

computer readable program code that is configured to compare a first susceptive coupling element determined for a first one of the plurality of conductors with respect to a second one of the plurality of conductors with a second susceptive coupling element determined for the second one of the plurality of conductors with respect to the first one of the plurality of conductors;

computer readable program code that is configured to select one of the first and the second susceptive coupling elements having a smallest magnitude; and computer readable program code that is configured to replace the non-selected susceptive coupling element with the selected susceptive coupling element in the susceptance coupling matrix.

30. The computer program product of claim 29, wherein the computer readable program code that is configured to define the plurality of windows comprises:

computer readable program code that is configured to form a localized inductance matrix for the respective ones of the plurality of conductors associated with the respective ones of the plurality of windows based on the respective other ones of the plurality of conductors contained in the respective ones of the plurality of windows.

31. A computer program product for modeling inductive effects in an integrated circuit/system that comprises a plurality of conductors, comprising:

a computer readable program medium having computer readable program code embodied therein, the computer readable program code comprising:

computer readable program code that is configured to define a plurality of windows, respective ones of the plurality of windows being associated with respective ones of the plurality of conductors and having other ones of the plurality of conductors contained therein; and computer readable program code that is configured to form a plurality of localized susceptive coupling vectors, respective ones of the susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero, computer readable program code configured to combine the plurality of localized susceptive coupling vectors into a susceptance coupling matrix;

computer readable program code configured to transform the susceptance coupling matrix so that the susceptance coupling matrix is symmetrical;

computer readable program code that is configured to sparsify the susceptance coupling matrix so as to cancel a susceptive coupling element; and computer readable program code that is configured to add a magnitude of the canceled susceptive coupling element to respective diagonal elements in the susceptance coupling matrix at rows and columns corresponding to ones of the plurality of conductors between which the canceled susceptive coupling element was determined.

32. The computer program product of claim 31, further comprising:

computer readable program code that is configured to use the susceptance coupling matrix in a susceptance-based circuit simulator.

33. A computer program product for modeling inductive effects in an integrated circuit/system that comprises a plurality of conductors, comprising:

a computer readable program medium having computer readable program code embodied therein, the computer readable program code comprising:

computer readable program code that is configured to define a plurality of windows, respective ones of the plurality of windows being associated with respective ones of the plurality of conductors and having other ones of the plurality of conductors contained therein; and computer readable program code that is configured to form a plurality of localized susceptive coupling vectors, respective ones of the susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;

computer readable program code configured to combine the plurality of localized susceptive coupling vectors into a susceptance coupling matrix;

computer readable program code configured to transform the susceptance coupling matrix so that the susceptance coupling matrix is symmetrical;

computer readable program code that is configured to invert the susceptance coupling matrix to obtain an inductance coupling matrix;

computer readable program code that is configured to sparsify the inductance coupling matrix so as to cancel an inductive coupling element; and computer readable program code that is configured to add a magnitude of the canceled inductive coupling element to respective diagonal elements in the inductance coupling matrix at rows and columns corresponding to ones of the plurality of conductors between which the the canceled inductive coupling element was determined.

34. The computer program product of claim 33, further comprising:
computer readable program code that is configured to use the inductance coupling matrix in an inductance-based circuit simulator.

35. A computer program product for modeling inductive effects in an integrated circuit/system that comprises a plurality of conductors, comprising:
a computer readable program medium having computer readable program code embodied therein, the computer readable program code comprising:
computer readable program code that is configured to define a plurality of windows, respective ones of the plurality of windows being associated with respective ones of the plurality of conductors and having other ones of the plurality of conductors contained therein; and
computer readable program code that is configured to form a plurality of localized susceptive coupling vectors, respective ones of the susceptive coupling vectors being populated with susceptive coupling elements by determining respective currents flowing through the other ones of the plurality of conductors such that the respective ones of the plurality of conductors associated with the respective ones of the plurality of windows have respective total magnetic fluxes of unity and the other ones of the plurality of conductors have respective total magnetic fluxes of zero;
computer readable program code configured to combine the plurality of localized susceptive coupling vectors into a susceptance coupling matrix; and
computer readable program code configured to transform the susceptance coupling matrix so that the susceptance coupling matrix is symmetrical;
wherein the computer readable program code that is configured to define a plurality of windows comprises:
computer readable program code that is configured to increase respective sizes for respective ones of the plurality of windows so as to contain additional other ones of the plurality of conductors until susceptive coupling elements for the additional other ones of the plurality of conductors are less than a threshold that is approximately 1% of respective self-term susceptive coupling element magnitudes corresponding to the respective ones of the plurality of conductors associated with the respective ones of the plurality of windows.

36. A computer program product for modeling inductive effects in an integrated circuit/system that comprises a plurality of conductors, comprising:
a computer readable program medium having computer readable program code embodied therein, the computer readable program code comprising:
computer readable program code that is configured to form a first localized inductance matrix for a first portion of the circuit and a second localized inductance matrix for a second portion of the circuit, the first and second localized inductance matrices being associated with first and second ones of the plurality of conductors, respectively;
computer readable program code that is configured to solve the first and second localized inductance matrices to obtain first and second localized susceptance vectors; and
computer readable program code that is configured to combine the first and second localized susceptance vectors to obtain a susceptance matrix, the computer readable program code that is configured to combine, comprising:
computer readable program code that is configured to compare a first susceptive coupling element in the first localized susceptance vector determined for the first one of the plurality of conductors with respect to a second one of the plurality of conductors with a second susceptive coupling element in the second localized susceptance vector determined for the second one of the plurality of conductors with respect to the first one of the plurality of conductors;
computer readable program code that is configured to select one of the first and the second susceptive coupling elements having a smallest magnitude; and
computer readable program code that is configured to replace the non-selected susceptive coupling element with the selected susceptive coupling element in the susceptance matrix.

37. The computer program product of claim 36, wherein the first and second localized inductance matrices are associated with first and second ones of the plurality of conductors, respectively, and wherein the computer readable program code that is configured to solve the first and second localized inductance matrices comprises:
computer readable program code that is configured to determine respective currents flowing through other ones of the plurality of conductors contained in a first window surrounding the first one of the plurality of conductors such that the first one of the plurality of conductors has a respective total magnetic flux of unity and the other ones of the plurality of conductors contained in the first window have respective total magnetic fluxes of zero; and
computer readable program code that is configured to determine respective currents flowing through other ones of the plurality of conductors contained in a second window surrounding the second one of the plurality of conductors such that the second one of the plurality of conductors has a respective total magnetic flux of unity and the other ones of the plurality of conductors contained in the second window have respective total magnetic fluxes of zero.

38. The computer program product of claim 36, further comprising:
computer readable program code that is configured to sparsify the susceptance matrix so as to cancel a susceptive coupling element; and
computer readable program code that is configured to add a magnitude of the canceled susceptive coupling element to respective diagonal elements in the susceptance matrix at rows and columns corresponding to ones of the plurality of conductors between which the canceled susceptive coupling element was determined.

39. The computer program product of claim 36, further comprising:
computer readable program code that is configured to use the susceptance matrix in a susceptance-based circuit simulator.

40. The computer program product of claim 36, further comprising:

computer readable program code that is configured to invert the susceptance matrix to obtain an inductance matrix.

41. The computer program product of claim 40, further comprising:
   computer readable program code that is configured to sparsify the inductance matrix so as to cancel an inductive coupling element; and
   computer readable program code that is configured to add a magnitude of the canceled inductive coupling element to respective diagonal elements in the inductance matrix at rows and columns corresponding to ones of the plurality of conductors between which the canceled inductive coupling element was determined.

42. The computer program product of claim 40, further comprising:
   computer readable program code that is configured to use the inductance matrix in an inductance-based circuit simulator.

43. A computer program product, comprising:
   a computer readable program medium having computer readable data structure embodied therein, the computer readable data structure comprising:
   a symmetrical matrix that comprises a combination of susceptive coupling elements between conductors in an integrated circuit/systems the susceptive coupling elements being determined by defining a plurality of windows, respective ones of the plurality of windows being associated with respective ones of the conductors and having other ones of the conductors contained therein, and determining respective currents flowing through the other ones of the conductors such that the respective ones of the conductors associated with the respective ones of the plurality of windows have respective total magnetic fluxes of unity and the other ones of the conductors have respective total magnetic fluxes of zero;
   wherein a fist susceptive coupling element determined for a first one of the conductors with respect to a second one of the plurality of conductors is compared with a second susceptive coupling element determined for the second one of the plurality of conductors with respect to the first one of the plurality of conductors to select one of the first and the second susceptive coupling elements having a smallest magnitude, and the non-selected susceptive coupling element is replaced in the matrix with the selected susceptive coupling element.

44. A computer program product, comprising:
   a computer readable program medium having computer readable data structure embodied therein, the computer readable data structure comprising:
   a symmetrical matrix that comprises a combination of susceptive coupling elements between conductors in an integrated circuit/system, the susceptive coupling elements being determined by defining a plurality of windows, respective ones of the plurality of windows being associated with respective ones of the conductors and having other ones of if the conductors contained therein, and determining respective currents flowing through the other ones of the conductors such that the respective ones of the conductors associated with the respective ones of the plurality of windows have respective total magnetic fluxes of unity and the other ones of the conductors have respective total magnetic fluxes of zero;
   wherein the matrix has been sparsified so that a susceptive coupling element has been canceled, and the magnitude of the canceled susceptive coupling element has been added to respective diagonal elements in the matrix at rows and columns corresponding to ones of the conductors between which the canceled susceptive coupling element was determined.

45. A computer program product, comprising:
   a computer readable program medium having computer readable data struture embodied therein, the computer readable data structure comprising:
   a matrix that comprises a combination of susceptive coupling elements between conductors in an integrated circuit/system wherein a first susceptive coupling element determined for a first one of the conductors with respect to a second one of the plurality of conductors is compared with a second susceptive coupling element determined for the second one of the plurality of conductors with respect to the first one of the plurality of conductors to select one of the first and the second susceptive coupling elements having a smallest magnitude, and the non-selected susceptive coupling element is replaced in the matrix with the selected susceptive coupling element.

46. The computer program product of claim 45, wherein the susceptive coupling elements have been determined by defining a plurality of windows, respective ones of the plurality of windows being associated with respective ones of the conductors and having other ones of the conductors contained therein, and determining respective currents flowing through the other ones of the conductors such that the respective ones of the conductors associated with the respective ones of the plurality of windows have respective total magnetic fluxes of unity and the other ones of the conductors have respective total magnetic fluxes of zero.

47. The computer program product of claim 45, wherein the matrix has been sparsified so that a susceptive coupling element has been canceled, and the magnitude of the canceled susceptive coupling element has been added to respective diagonal elements in the matrix at rows and columns corresponding to ones of the conductors between which the canceled susceptive coupling element was determined.

* * * * *